Feb. 15, 1938.  E. A. BESSOM  2,108,161
HEEL SEAT FITTING MACHINE
Filed Jan. 14, 1937  12 Sheets-Sheet 4

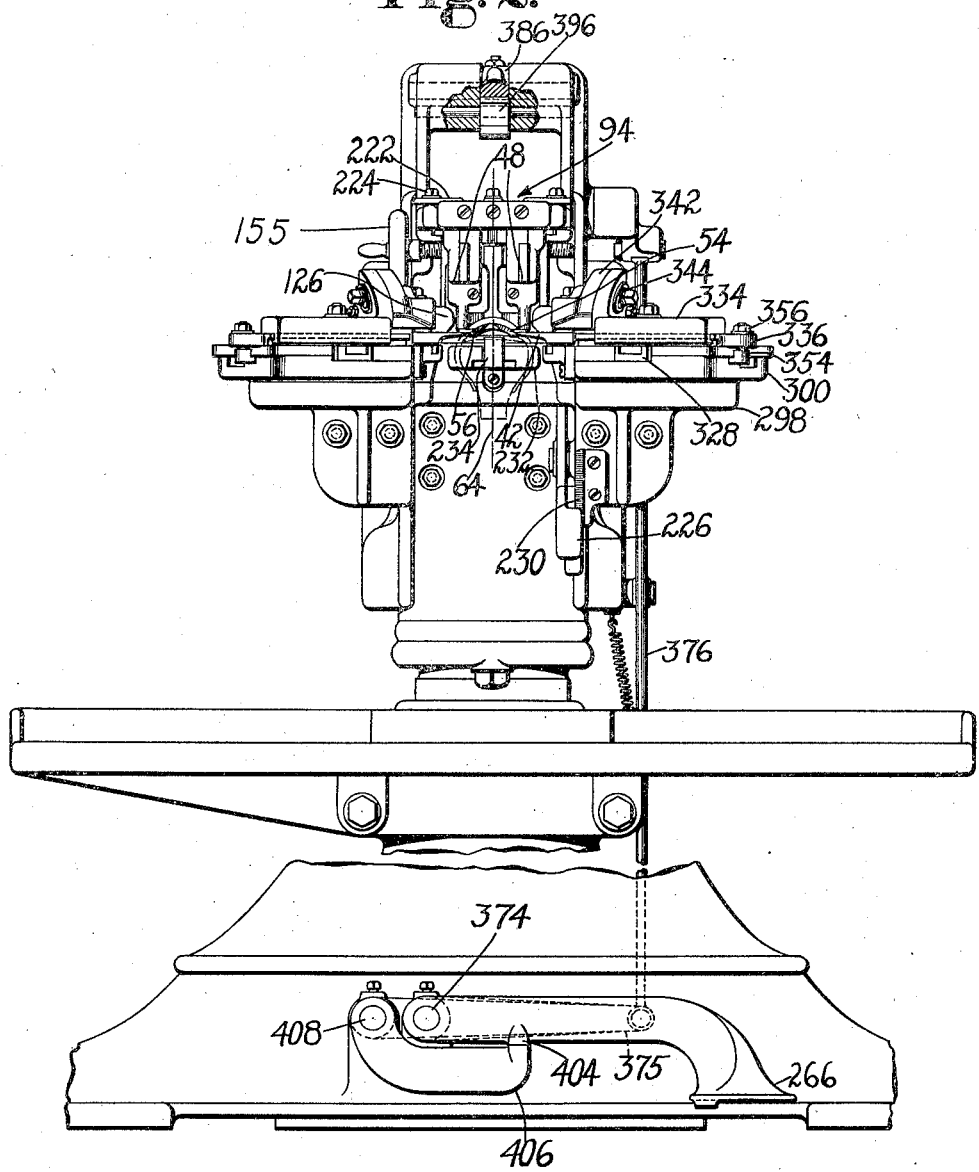

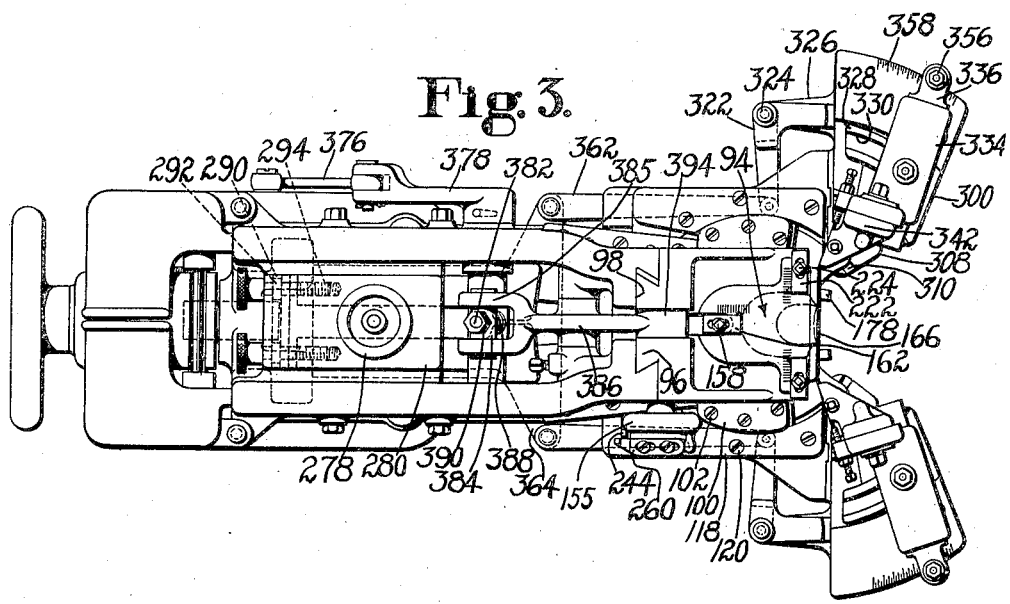
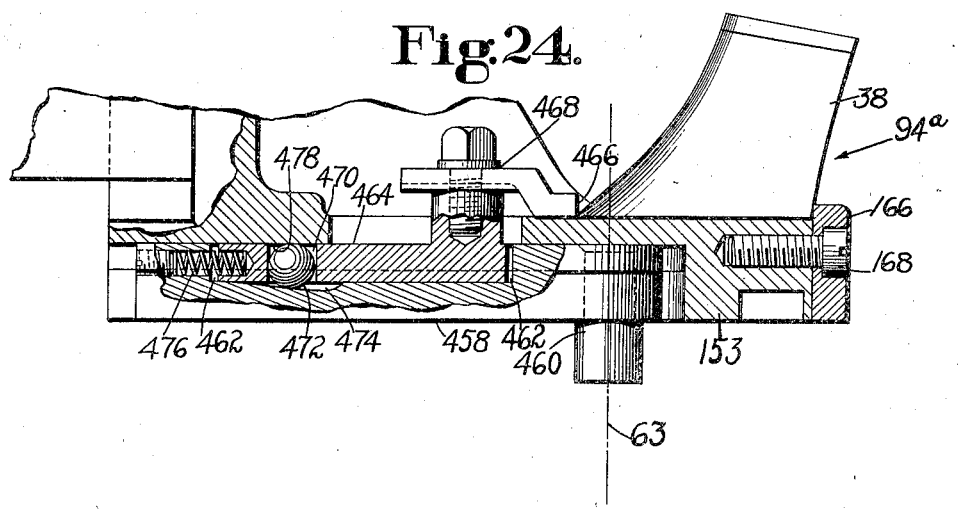

INVENTOR
Earl A. Bessom
By his Attorney
Victor Cohl

Feb. 15, 1938. E. A. BESSOM 2,108,161
HEEL SEAT FITTING MACHINE
Filed Jan. 14, 1937 12 Sheets-Sheet 5
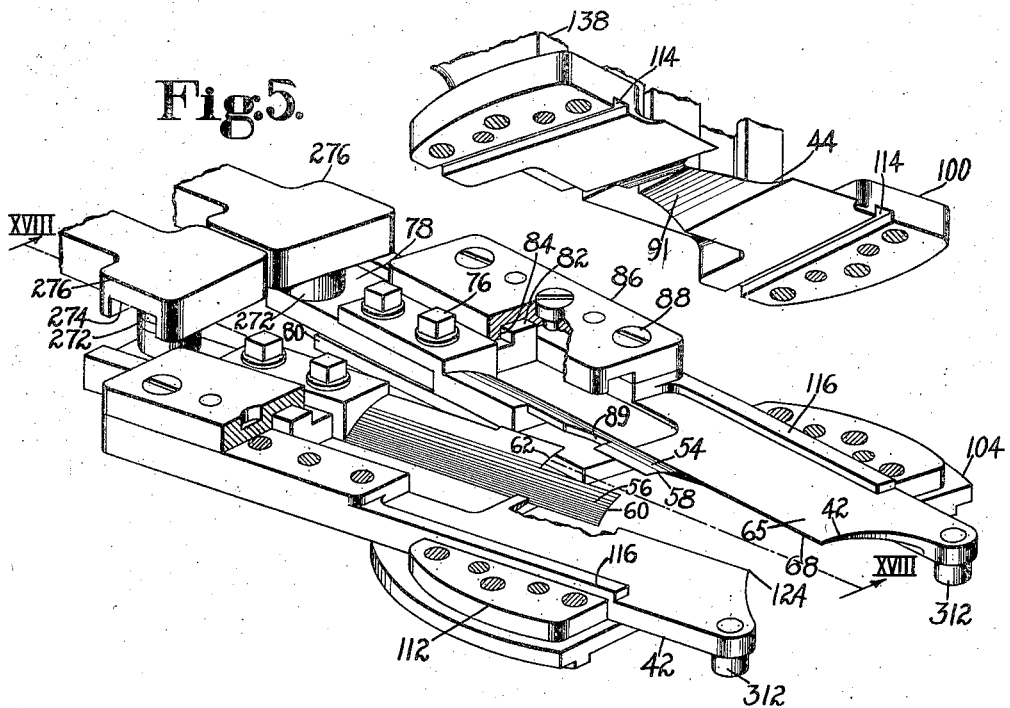
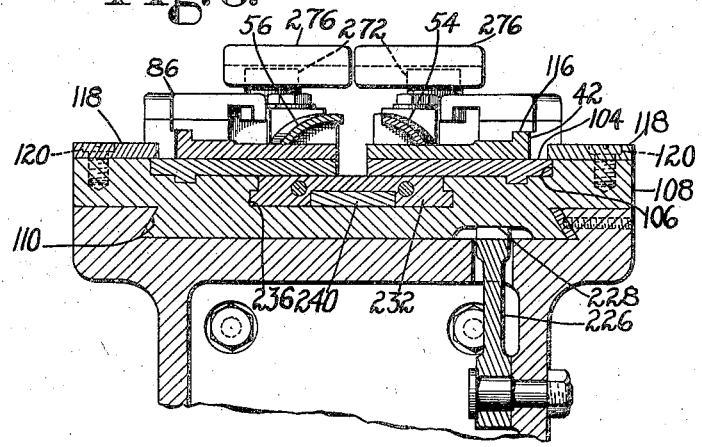
INVENTOR
Earl A. Bessom
By his attorney
Victor Cole INVENTOR
Earl A. Bessom
By his attorney
Victor Cobb Feb. 15, 1938.   E. A. BESSOM   2,108,161
HEEL SEAT FITTING MACHINE
Filed Jan. 14, 1937   12 Sheets-Sheet 7
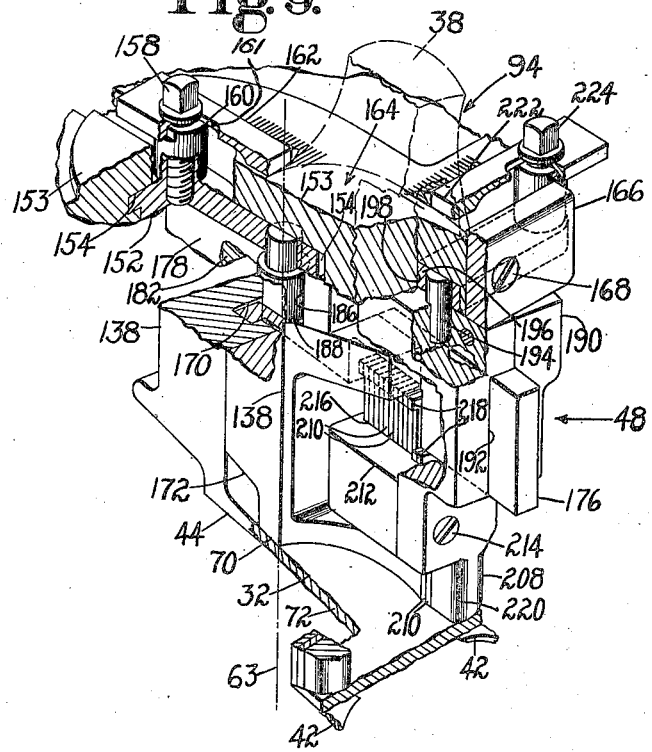
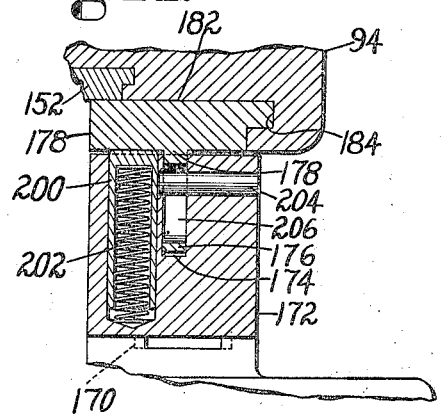
INVENTOR
Earl A. Bessom
By his attorney
Victor Coll

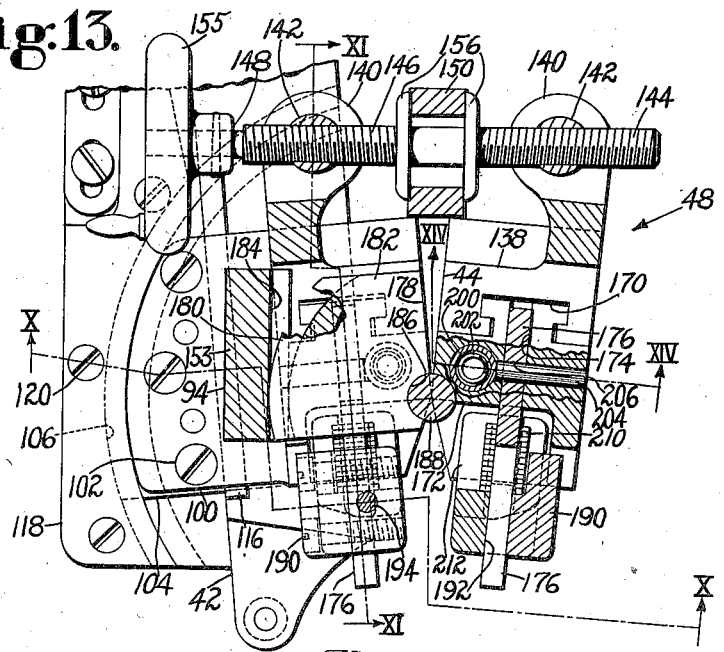
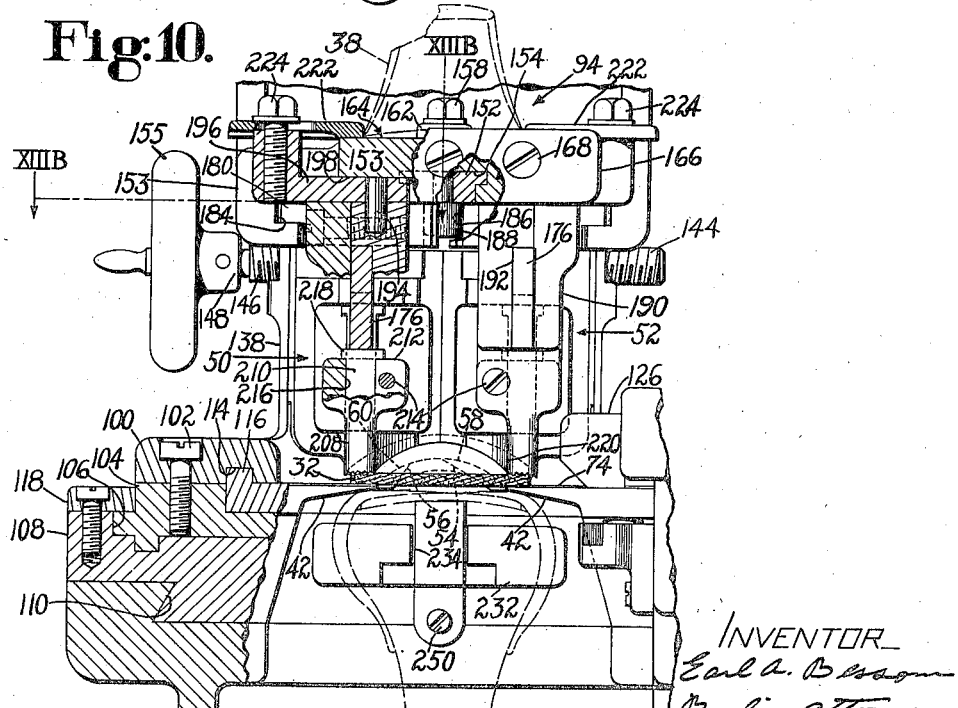

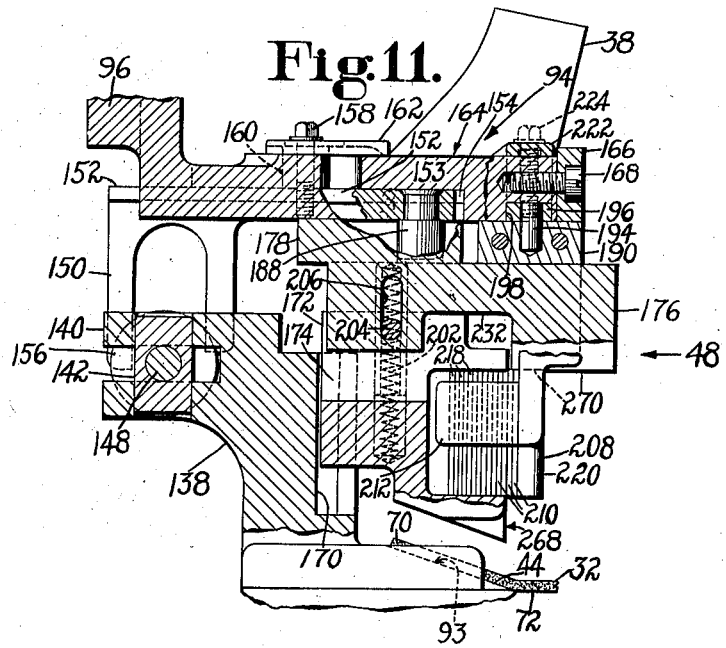
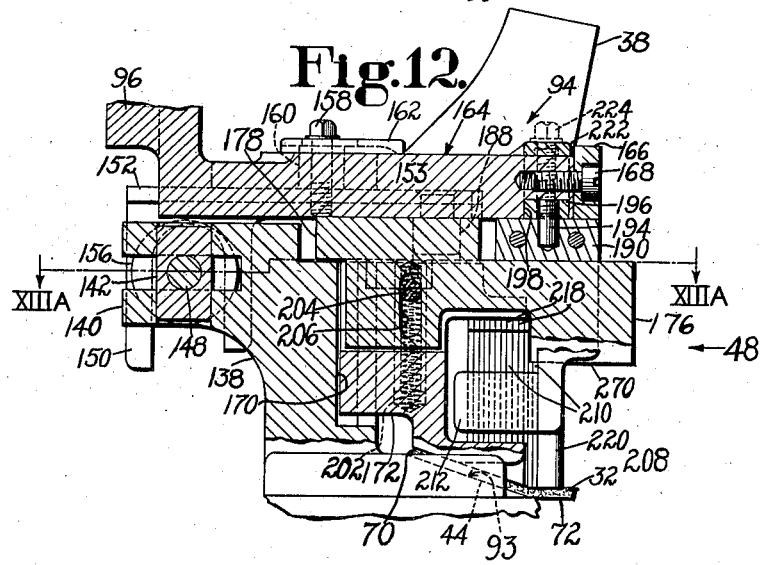

Feb. 15, 1938.  E. A. BESSOM  2,108,161
HEEL SEAT FITTING MACHINE
Filed Jan. 14, 1937   12 Sheets-Sheet 10
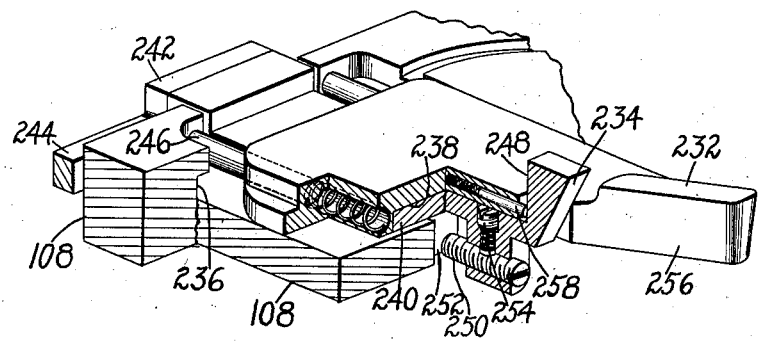
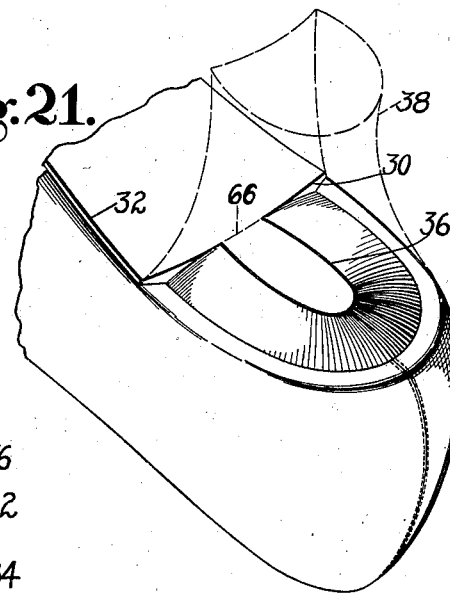
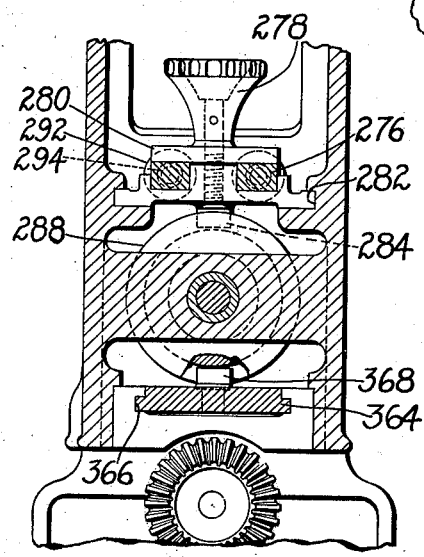

Feb. 15, 1938. E. A. BESSOM 2,108,161
HEEL SEAT FITTING MACHINE
Filed Jan. 14, 1937 12 Sheets-Sheet 11

INVENTOR
Earl A. Bessom
By his attorney
Victor Cobb

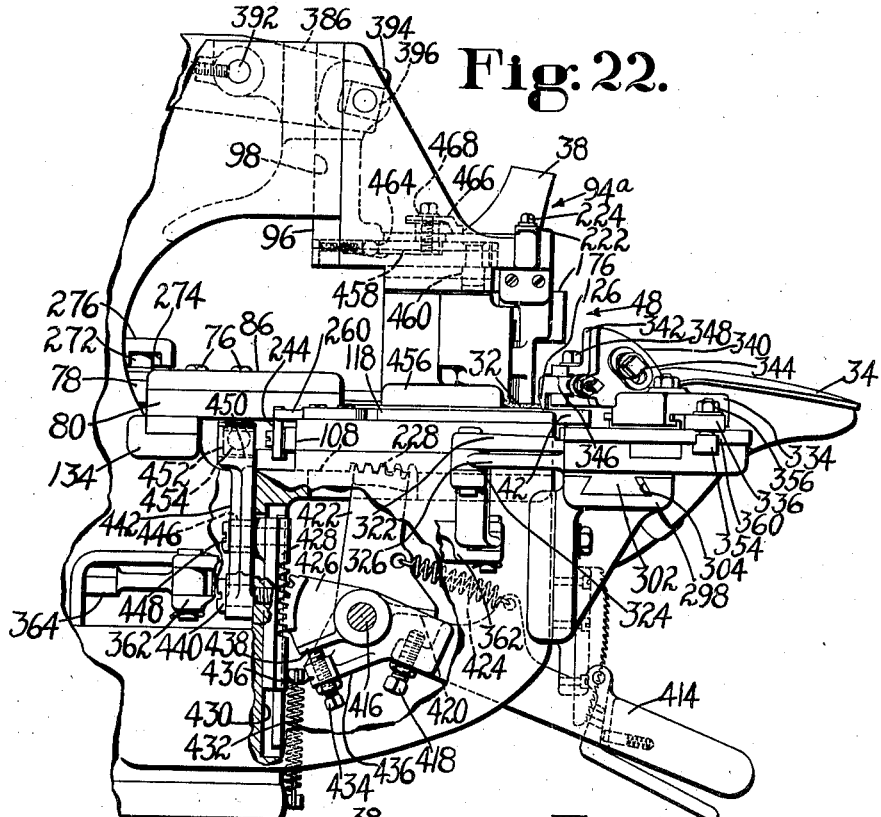
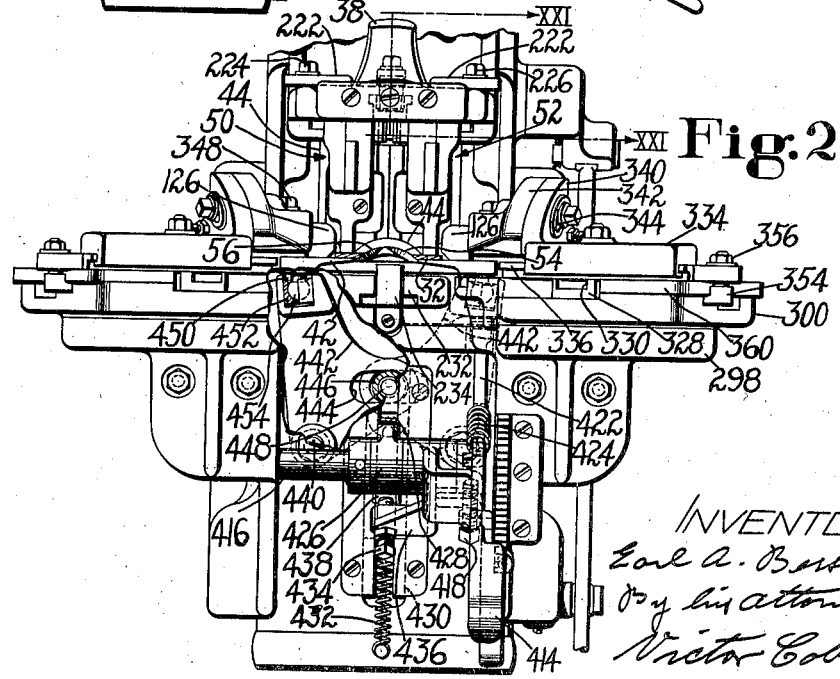

Patented Feb. 15, 1938

2,108,161

UNITED STATES PATENT OFFICE 2,108,161

HEEL-SEAT FITTING MACHINE

Earl A. Bessom, Meadville, Pa., assignor to United Shoe Machinery Corporation, Paterson, N. J., a corporation of New Jersey Application January 14, 1937, Serial No. 120,603

77 Claims. (Cl. 12—31.5)

This invention relates to improvements in heel-seat fitting machines for use in the manufacture of shoes.

It is an object of this invention to provide an improved machine which is of the general type disclosed in United States Letters Patent No. 2,092,045, granted September 7, 1937 on an application filed in my name, and by the use of which the heel-seat portions of the soles of shoes may be quickly and effectively reduced to shapes complemental to the cups of the respective heels to be attached to the shoes. With the above object in view, and in accordance with one feature of my invention, I have provided in a heel-seat fitting machine, means for holding the heel-seat portion of the sole of a shoe in a predetermined position, knives for reducing the heel-seat portion of the sole lengthwise and widthwise, a gage for measuring a heel lengthwise and widthwise, and mechanism for varying the length and the width of the reduced heel-seat portion of the sole in accordance with the length and the width of the heel measured in the gage.

In the illustrated machine the positioned heel-seat portion of the sole of the shoe is forced by a U-shaped clamp against opposing pairs of front and back plates forming a U-shaped opening and constructed and arranged to engage within the rand crease of the shoe. The back crease plates form the bight portion of the U-shaped opening and have sole-engaging faces inclined to the sole-engaging faces of the front plates which form the sides of the U-shaped opening and engage within the side margins of the rand crease of the shoe without distorting the sole. The rear part of the heel-seat portion of the sole of the shoe supported by the inclined faces of the back crease plates is bent away from the shoe upper and is disposed in oblique relation to the paths of movement of a pair of heel-seat reducing knives, which engage within grooves formed at the under sides of corresponding back crease plates and have cutting edges arched transversely of their respective paths of movement. The heel-seat reducing knives move forward through the bight portion of the U-shaped opening and then through the rear part of the heel-seat portion of the sole supported by the inclined faces of the back plates, thereby reducing the heel-seat portion of the sole lengthwise. As the knives continue to move forward the lower outer ends of their cutting edges travel along the edges of the front crease plates defining the sides of the U-shaped opening, thereby reducing the heel-seat portion of the sole widthwise by beveling cuts.

A pair of knives movable inwardly from opposite sides of the sole are operated either before or after the operation of the heel-seat reducing knives to form heel-breast receiving shoulders upon the sole. The outline of the tab formed by the heel-seat reducing and shoulder-forming knives is substantially the same as that of the U-shaped opening.

In order that the width of the tab may be varied in accordance with the width of the attaching face of the heel to be attached to the shoe, and in accordance with another feature of my invention, right and left pairs of front and back crease plates, together with guideways for corresponding heel-seat reducing knives, are mounted for pivotal adjustment, whereby to vary the width of the U-shaped opening and the paths of movement of the knives. In order to vary the length of the tab the back crease plates, in accordance with a further feature of my invention, are adjustable lengthwise of the U-shaped opening with relation to the front crease plates, whereby to vary the length of the U-shaped opening and therefore the effective length of the cutting strokes of the heel-seat reducing knives.

To insure that the entire margin of the heel-seat portion of the sole be effectively forced against portions of the front and back crease plates bordering the U-shaped opening, irrespective of the angular adjustment of the plates and the lengthwise adjustment of the back plates with relation to the front plates, the clamp for forcing the margin against the plates, in accordance with another feature of my invention, comprises opposed pairs of front and back presser members which are angularly adjustable together with and to the same extent as corresponding pairs of front and back crease plates, the back presser members also being mounted for adjustment lengthwise of the U-shaped opening, together with corresponding back crease plates. During the sole-clamping operation gaps formed between corresponding pairs of front and back presser members are automatically filled by filler plates, one or more of which may be moved into operative position in each of the gaps in accordance with the adjusted positions of the back presser members.

In order that the back crease plates and the back presser members of the clamp may be quickly and effectively adjusted into their different operative positions in accordance with the lengthwise dimension of the heel in the heel gage, a slide of the gage, in accordance with a further feature of my invention, is operatively connected to the back crease plates and to the back presser members. The gage is also provided with a pair of abutments which are operatively connected to corresponding guideways for the heel-seat reducing knives, pairs of front and back crease plates, and pairs of front and back presser members for adjusting the same into different operative positions in accordance with the width of the heel in the gage.

In order that the corners of the front crease plates defining the forward extent of the U-shaped opening remain in a fixed line as the front and back crease plates are pivotally adjusted, the front plates are moved lengthwise to a slight extent by cams as they are moved into their different angular positions. The starting positions of the heel-seat reducing knives are also changed slightly through the provision of suitable cams in accordance with the angular setting of the crease plates, thereby insuring that the outer ends of the cutting edges of the knives end their cutting strokes at the front corners of the front crease plates irrespective of the angular adjustment of the crease plates and the guideways for the knives.

Guideways for the shoulder-forming knives are angularly adjustable into different operative positions upon carrier slides, for varying the paths of movement of the knives transversely of the sole. It is desirable that the cutting strokes of the shoulder-forming as well as the heel-seat reducing knives terminate when the lower ends of their cutting edges have moved to the corners of the front plates defining the forward extent of the U-shaped opening. Since the corners move into different positions along a fixed line extending transversely of the sole as the front plates are angularly adjusted, the carrier slides are operatively connected to corresponding front crease plates so as to insure that the relative positions of the corners of the plates and the guideways for the shoulder-forming knives remain the same for different angular adjustments of the plates. It will thus be noted that the cutting strokes of the heel-seat reducing and shoulder-forming knives terminate when the lower ends of their respective cutting edges have moved to the above-mentioned corners of the crease plates, regardless of the angular adjustment of the crease plates and the guideways for the knives.

Mechanism for adjusting the crease plates, the presser members and the guideways for the heel-seat reducing and shoulder-forming knives into their different correlated positions in accordance with the length and width of the heel in the gage is quickly and effectively actuated by a hand lever.

The above and other features of the invention, including certain details of construction and combinations of parts, will be described as embodied in an illustrated machine and pointed out in the appended claims.

In the drawings,

Figs. 2 and 3 are front and plan views, respectively, of the machine;

Fig. 5 is an exploded view illustrating the crease plates and the heel-seat reducing knives of the machine;

Fig. 8 is a section on line VIII—VIII of Fig. 1;

Fig. 9 is a perspective view, partly in section, showing in detail the construction of the clamp for forcing the margin of the heel-seat portion of the sole against the crease plates;

Fig. 10 is an enlarged front view, partly in section, of the operating head of the machine;

Figs. 11 and 12 are vertical sections on line XI—XI of Fig. 13, Fig. 11 illustrating the relative positions of the parts of the clamp when the machine is idle, and Fig. 12 illustrating the relative positions of the parts of the clamp when the same has been forced against the sole supported by the crease plates;

Fig. 13 is a section, partly broken away, on line XIIIA—XIIIA of Fig. 12 and on line XIIIB—XIIIB of Fig. 10;

Fig. 14 is an enlarged section showing a portion of the clamp on line XIV—XIV of Fig. 13;

Fig. 16 is a perspective view, partly in section, of the shoe-positioning mechanism illustrated in Fig. 15;

Fig. 17 is a section on line XVII—XVII of Fig. 1;

Fig. 21 is a perspective view of the heel seat of a shoe the sole of which has been fitted for the reception of a heel by the use of the above machine;

Figs. 22 and 23 are side and front views, respectively, of the operating head of a modified heel-seat fitting machine similar to that illustrated in Figs. 1 to 20, inclusive; and Fig. 24 is an enlarged side view, partly in section, of the heel gage of the machine illustrated in Figs. 22 and 23.

Figure 1:
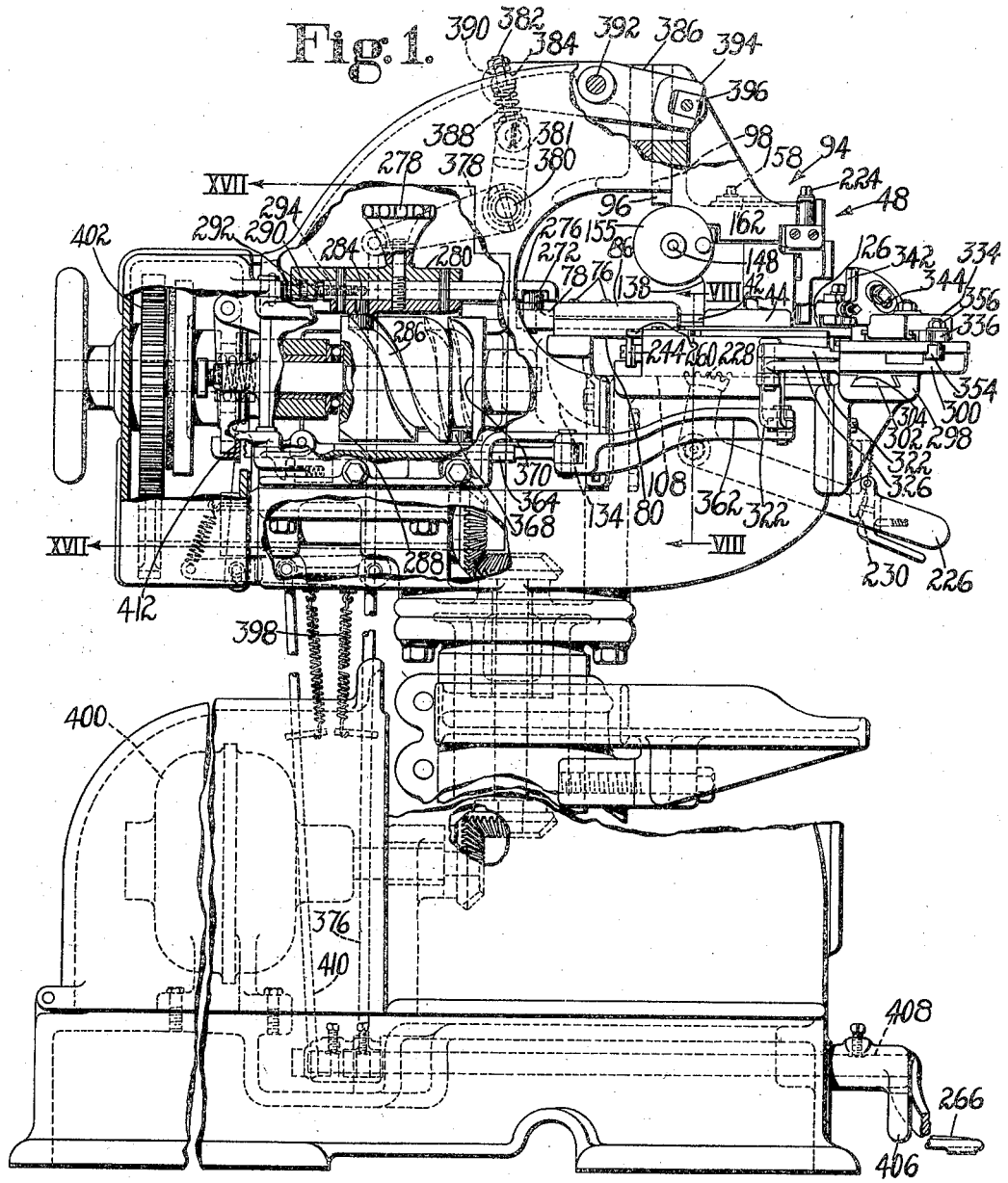
Fig. 1 is a side view, partly in section, of the illustrated machine.

The illustrated machine is described with reference to forming a pair of heel-breast receiving shoulders 30 (Fig. 21) upon the sole 32 of a shoe 34, and reducing the heel-seat portion of the sole to provide a tab 36 to fit within the cup of a wood heel 38 to be attached to the shoe.

The heel-seat portion of the sole 32 of the shoe is positioned by mechanism (Figs. 15 and 16) which will be described later, upon a platen 40 (Figs. 4 and 7) comprising front and back plates 42, 44, respectively, forming a U-shaped opening 46 and constructed and arranged to engage within the rand crease of the shoe. The margin of the positioned heel-seat portion of the sole is forced against portions of the plates 42, 44 bordering the U-shaped opening by a clamp 48 (Figs. 1 and 2) comprising left and right clamp units 50, 52 (Fig. 10). When the heel-seat portion of the sole has been effectively clamped in the machine between the platen 40 and the clamp units 50, 52, a pair of knives 54, 56 are moved lengthwise of the sole to reduce the heel-seat portion of the same. It will be noted that in reducing the heel-seat portion of the sole the knives 54, 56 travel in predetermined paths extending through the bight or closed end 57 (Fig. 4) of the U-shaped opening 46 which is raised with relation to the forward part of the opening, and then along the sides of the opening. The cutting edge 58 of the knife 54, as well as the leading and the trailing cutting edges 60, 62, respectively, of the knife 56, are arched transversely of their paths of movement. In using the term "arched" in describing the cutting edges of the knives 54, 56 it is not intended that such term shall necessarily imply that the cutting edges are curved, since it will be obvious that the edges may comprise a plurality of straight sections.

Left and right pairs of front and back plates 42, 44 together with corresponding clamp units 50, 52 may be swung into different angular positions about an axis 63 (Figs. 4 and 9) with relation to a vertical median plane 64 (Figs. 6 and 7) in accordance with the desired width of the tab 36 (Fig. 21) to be formed. The axis 63 is disposed at right angles to the sole-supporting faces 65 of the front plates 42 and intersects the central point of the closed end of the U-shaped opening 46. It is desirable that the tab 36 be narrower at its heel-breast line 66 than at its central portion, and accordingly opposing edges 68 (Figs. 5 and 7) of the front plates 42, which are engaged by the cutting edges 58, 60 of the respective knives 54, 56 converge forwardly. In order that the heel-seat reducing knives 54, 56 during their cutting movement shall engage edges of the front and back plates 42, 44 defining the U-shaped opening 46, irrespective of the angular adjustment of the plates, the paths of movement of the knives 54, 56 may be varied by mechanism which will be described later.

Figure 19:
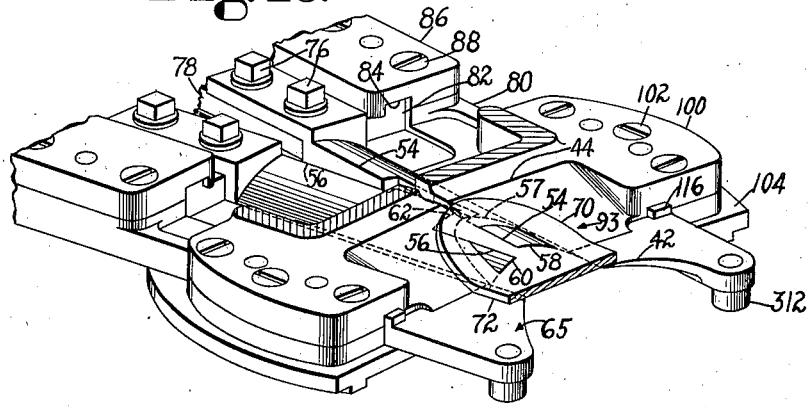
Figs. 19 and 20 are illustrative views showing the relation of the heel-seat reducing knives and the sole supported by the crease plates during two stages of the heel-seat reducing operation.
Figure 20:
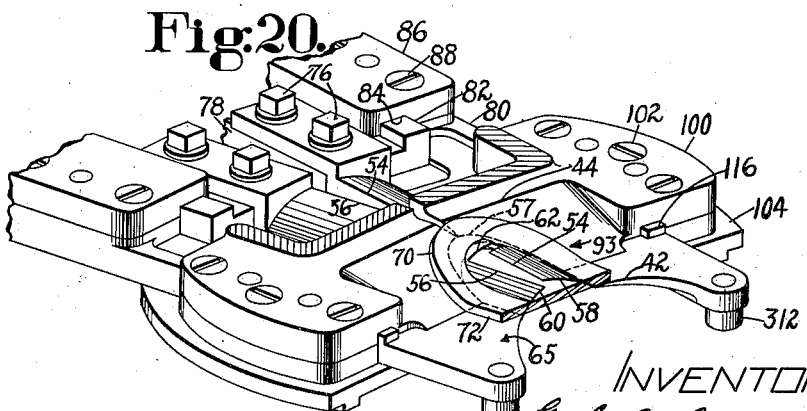

In order that the knives 54, 56 shall reduce the heel-seat portion of the sole lengthwise by beveling cuts during their forward movement, the rear part 70 (Figs. 9, 11, 12, 15, 19 and 20) of the heel-seat portion of the sole is bent away from the shoe upper by the back plates 44 with relation to the forward part 72 of the heel-seat portion, the cutting edges of the knives passing through the bight portion 57 (Figs. 4, 19 and 20) of the U-shaped opening 46 and then through the rear part 70 of the heel-seat portion of the sole. The sole-supporting faces 65 of the front plates 42 are flat, the portions of the plates bordering the U-shaped opening 46 being thin in order that they may engage within the rand crease of the shoe without substantially distorting the forward part 72 of the heel-seat portion of the sole. As the cutting edges of the knives 54, 56 continue their forward movement along the edges 68 of the front plates 42 (Fig. 20), the forward part 72 of the heel-seat portion of the sole is reduced widthwise by beveling cuts.

The knives 54, 56 may be angularly adjusted together with corresponding front and back plates 42, 44, by securing the knives through screws 76 (Figs. 4, 5 and 15) to carriers 78 which are supported for sliding movement upon rear extensions 80 of the front plates 42 and have upwardly extending ribs 82 engaging within guideways 84 formed in the under sides of retaining plates 86 which are secured by screws 88 to the rear extensions 80 of the front plates.

Figure 18:
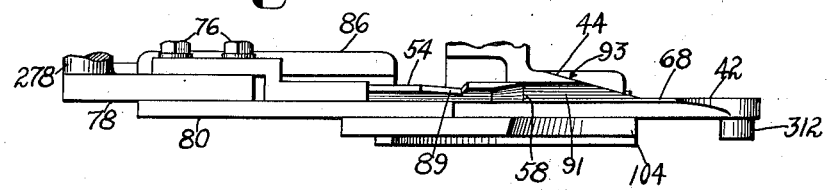
Fig. 18 is a detailed showing of the front and back crease plates and one of the heel-seat reducing knives of the machine as viewed from line XVIII—XVIII of Fig. 5 after the back crease plates have been secured in their operative positions upon the front crease plates.

In order to steady the knives 54, 56 during their forward movement, the rear plates 44 are provided with grooves 91 (Figs. 5 and 18) which are engaged by the knives. The grooves 91 intersect the sole-supporting faces 93 of corresponding back plates 44 to form the bight portion 57 of the U-shaped opening 46 which may be described as having the general appearance of the entrance to a tunnel, as viewed from the forward end of the opening.

The guideways 84 (Fig. 5) may be moved into different angular positions to vary the paths of movement of the knives 54, 56 in accordance with the desired width of the tab 36. It will be noted that the cutting edges 58, 60 of the respective knives 54, 56 during their forward movement form spaced incisions in the bent-up rear part 70 (Fig. 19) of the sole as they pass through the same, the trailing cutting edge 62 (Fig. 20) forming in the sole an incision connecting the incisions previously formed by the leading cutting edges, thereby reducing the heel-seat portion of the sole lengthwise. In order to avoid interference between the knives 54, 56 as they converge during their forward movement, the knife 54 is provided with a notch 89 (Figs. 5 and 18) for receiving an opposed portion of the knife 56.

It will be clear from the foregoing that the outline of the tab 36 (Fig. 21) is substantially the same as that of the U-shaped opening 46, the width of the tab varying in accordance with the angular adjustment of right and left pairs of plates 42, 44 and the guideways 84 for the knives 54, 56.

In order to vary the length of the U-shaped opening 46 and therefore the length of the tab 36, in accordance with variations in the length of the cup or attaching face of the heel, the back plates 44 are mounted for forward and rearward adjustment with relation to the front plates 42. The angular adjustment of corresponding pairs of front and back plates 42, 44 about the axis 63 (Fig. 4) and the forward and rearward adjustment of the back plates 44 with relation to the front plates 42 are effected through mechanism which is operatively connected to heel measuring parts of a heel gage 94 and will later be described in detail. Right and left clamp units 50, 52 (Fig. 10) are also operatively connected to the heel gage 94 which comprises a dovetailed extension 96 fitting in a vertical guideway 98 (Figs. 1 and 4) of the machine frame.

Figure 4:
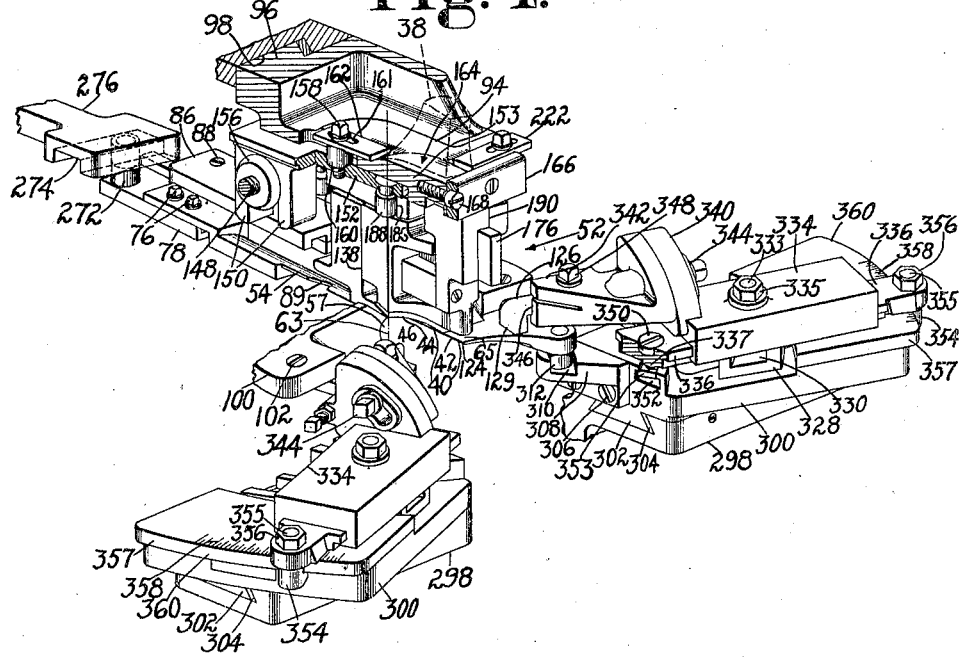
Fig. 4 is a perspective view, partly in section, showing portions of the operating head of the machine.

Each of the back plates 44 is provided with a lateral extension 100 (Figs. 5, 7, 13, 19 and 20) which is secured by screws 102 to an arcuate plate 104 engaging within an arcuate guideway 106 (Figs. 7 and 8) of a carrier slide 108 movable into different forward and rearward positions along a guideway 110. The guideway 106 is centered about the axis 63 (Fig. 4). The front plates 42 are supported by the arcuate plates 104 and have their outer faces in engagement with upstanding projections 112 of the arcuate plates. The lateral extensions 100 of the back plates 44 are provided with slots 114 (Fig. 5) for receiving upstanding ribs 116 of corresponding front plates 42. The arcuate plates 104 are held in their respective guideways 106 by retaining plates 118 (Fig. 8) secured to the carrier slide 108 by screws 120.

The cutting strokes of the heel-seat reducing knives 54, 56 and knives 126 which move transversely of the sole to form the heel-breast receiving shoulders 30, terminate when the lower ends of the cutting edges of the knives have moved approximately to the corners 124 of the front plates 42. It will be noted that the paths of movement of the cutting edges 58, 60 of the heel-seat reducing knives may intersect the paths of movement of the cutting edges 129 of the shoulder-forming knives 126 to insure the formation of clean-cut heel-breast receiving shoulders 30. The shoulder-forming knives 126 may be operated either before or after the heel-seat reducing knives 54, 56. Moreover, the shoulder-forming knives may be withdrawn from the work as soon as they reach the ends of their cutting strokes or may be temporarily stopped at the ends of their cutting strokes to serve as anvils against which the heel-seat reducing knives operate, as disclosed in United States Letters Patent No. 1,980,371, granted November 13, 1934 upon an application filed in my name.

Irrespective of the angular adjustment of the plates 42 about the axis 63 (Fig. 4) the corners 124 of the front plates 42, which define the forward or open end of the U-shaped opening 46, lie approximately in a line 122 (Fig. 7) which is disposed at right angles to the vertical median plane 64 and may be referred to as the breast line of the machine. Rolls 130 (Figs. 7 and 15) are secured to the rear extensions 80 of the front plates 42 and engage within corresponding camways 132 of a bracket 134 secured to the machine frame by screws 136. The camways 132 operating through the rolls 130 cause the front plates 42 to move slightly lengthwise of the U-shaped opening as they are angularly adjusted about the axis 63, thereby compensating for the slight forward or rearward displacement of the corners 124 due to the angular movement and insuring that the corners 124 at all times lie approximately in the breast line 122 of the machine.

Each back plate 44 has a vertical shank 138 provided with bifurcations 140 (Figs. 11, 12 and 13) carrying a trunnion 142. The trunnions 142 are in threaded engagement with left and right-hand threads 144, 146 (Fig. 13), respectively, of a screw 148 held against movement lengthwise of its axis by a bifurcated portion 150 of a T-shaped slide 152 which is movable along a guideway 154 (Fig. 9) formed in the under side of a heel-supporting platform 153 of the heel gage 94. The bifurcated portion 150 of the slide 152 straddles the screw 148 and fits between spaced collars 156 (Fig. 13) secured to the screw. The screw 148 may be conveniently rotated to swing the back plates 44 about the axis 63, through the provision of a hand wheel 155. The slide 152 is adjustably secured to a slide 162 which is movable forward and rearward over a heel-supporting surface 164 of the platform 153, through the provision of a screw 158 which is in threaded engagement with the slide 152, carries a spacer 160 and passes through an elongated slot 161 (Figs. 4 and 9) formed in the slide 162. The slide 162 is moved forward through mechanism which will be described later, until it engages the rear end of the heel 38 the breast of which is in engagement with a bar 166 secured by screws 168 to the forward end of the platform 153.

The shank 138 of each of the back plates 44 is provided with a vertical guideway 170 (Figs. 9, 11 and 12) for receiving a back presser member 172 of a corresponding clamp unit 50, 52. The back presser members 172 are provided with vertical slots 174 for receiving depending flanges 176 (Figs. 9 to 14, inclusive) of corresponding suspension blocks 178. The outer margins 180 of top flanges 182 of the respective suspension blocks 178 are arcuate and engage within corresponding horizontal slots 184 of the platform 153, the opposing faces of the top flanges 182 having recesses 186 for receiving a depending pin 188 secured to the forward portion of the T-shaped slide 152.

Figure 7:
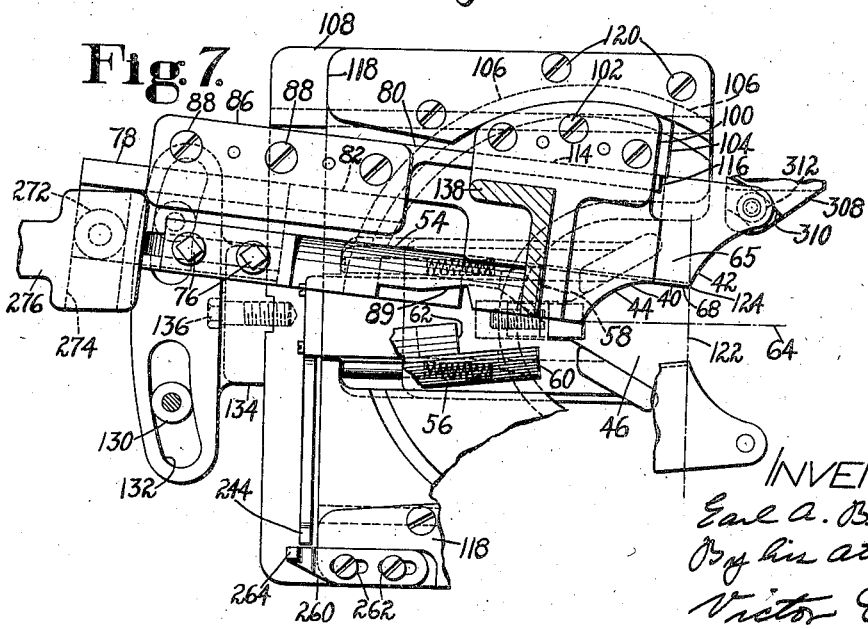

Front presser members 190 (Figs. 9, 10 and 13) of corresponding left and right clamp units have recesses 192 (Figs. 10 and 13) in which the depending flanges 176 of the suspension blocks 178 slidingly fit. The front presser members 190 are pivotally secured by corresponding pins 194 to slides 196 engaging within guideways 198 formed at the under side of the platform 153 of the heel gage 94, the guideways being disposed at right angles to the vertical median plane 64 (Fig. 7).

Each of the back presser members 172 is bored to receive a housing 200 (Figs. 13 and 14) for a spring 202 which forces the back presser member 172 into a lowered position with relation to the suspension block 178 when the clamp 48 is moved with the heel gage 94 into the raised position shown in Fig. 11. Secured to each back presser member 172 is a pin 204 (Figs. 11, 12 and 14) engaging within a slot 206 formed in the depending flange 176 of the corresponding suspension block 178. During the first part of the upward movement of the suspension blocks 178 and the front presser members 190 from their clamping positions (Fig. 12) the springs 202 cause the back presser members 172 to remain in forced engagement with the margin of the heel-seat portion of the sole. Upon continued upward movement of the suspension blocks 178 and the front presser members 190 the lower ends of the slots 206 engage the pins 204, thereby moving the back presser members 172 along corresponding guideways 170 into their raised positions (Fig. 11).

Each of the front presser members 190 comprises a forefoot 208 and a plurality of filler plates 210 supported by a filler plate carrier 212 secured to the forefoot by screws 214. The filler plates 210 are T-shaped and have shanks fitting in a recess 216 of the corresponding plate carrier 212, the heads 218 of all the filler plates 210 being in engagement with the upper face of the corresponding carrier when the clamp is in its raised position (Fig. 11). The sole-engaging faces of the back presser members 172 are shaped and arranged to force the margin of the rear part 70 of the heel-seat portion of the sole against portions of the face 93 of the back plates 44 bordering the bight portion 57 of the U-shaped opening 46. The lower faces of the operative filler plates 210 and the forefeet 208 of the front presser members 190 are shaped and arranged to force the side margins of the heel-seat portion of the sole against portions of the faces 65 of the front plates 42 bordering the U-shaped opening 46.

Figure 6:
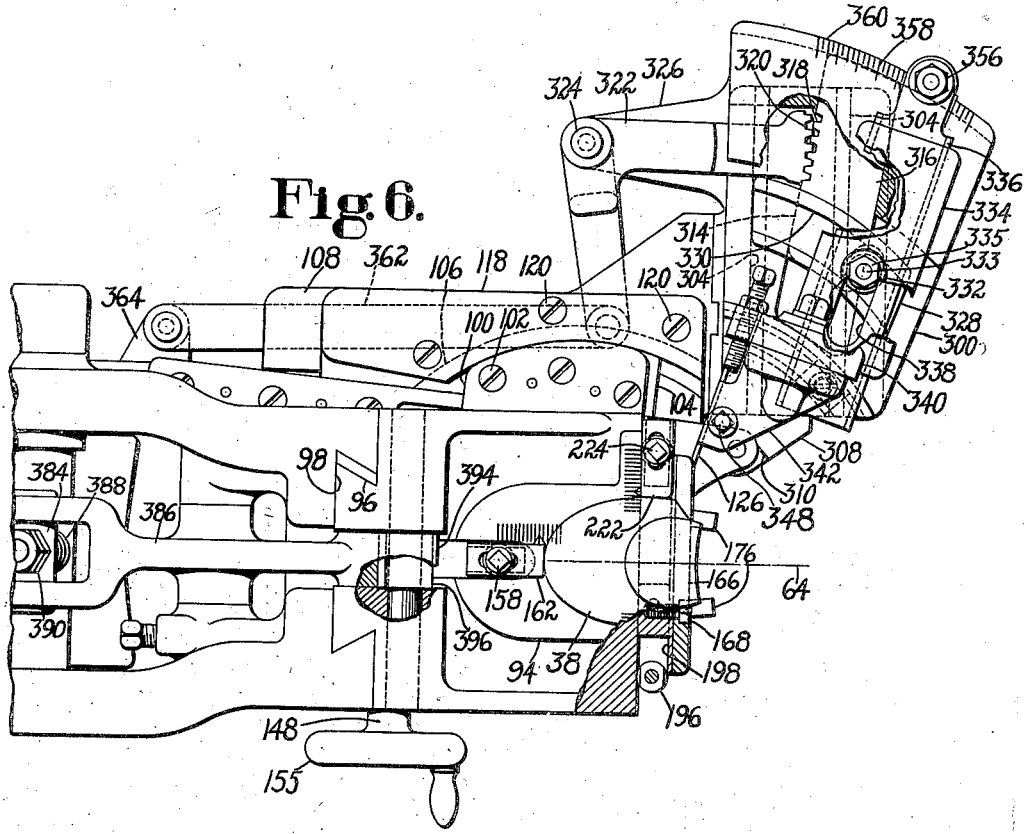
Figs. 6 and 7 are enlarged views, partly in section, showing in detail the construction of portions of the operating head of the machine.

The arcuate margins 180 (Figs. 10 and 13) of the suspension blocks 178 are centered about the axis 63 (Figs. 4 and 9) which coincides with the axis of the depending pin 188 carried by the T-shaped slide 152. It will thus be clear that if the screw 148 is rotated, right and left pairs of plates 42, 44 and presser members 172, 190 are swung equal distances toward or away from the vertical median plane 64 (Figs. 6 and 7). As above explained, the corners 124 of the front plates 42 travel along the line 122 as the plates 42, 44 are angularly adjusted about the axis 63.

Since the forefeet 208 are pivotally secured through pins 194 to corresponding slides 196, they move transversely of the sole in rectilinear paths as the suspension blocks 178 are angularly adjusted, and also turn slightly about the axes of corresponding pins during their movement in said paths. It is desirable that the forefeet 208 effectively secure the forward margins of the positioned heel-seat portion of the sole against opposing portions of corresponding front plates 42 irrespective of the setting of the plates. Accordingly, the forefeet 208 extend approximately to but not forwardly of the breast line 122 (Figs. 6 and 7) of the machine and have rounded corners 220 past which corresponding shoulder-forming knives 126 move.

The heel upon the supporting face 164 of the platform 153 is measured widthwise by abutments 222 secured by screws 224 to corresponding slides 196 which, as above stated, are pivotally secured to the front presser members 190. When the breast of the heel upon the supporting face 164 has been forced against the bar 166 under the action of the slide 162 the screw 148 is rotated by the use of the hand wheel 155 until the abutments 222 engage opposite sides of the heel thereby centralizing and measuring the same widthwise in the gage 94. As the screw 148 is rotated, right and left pairs of plates 42, 44, together with corresponding clamping units 50, 52 and guideways 84 for the heel-seat-reducing knives 54, 56, swing about the axis 63 into predetermined angular positions in accordance with the positions of the heel-measuring abutments 222.

The carrier slide 108 and the back plate 44 are moved forward and rearward through the provision of a bell-crank lever 226 (Figs. 1, 2 and 8) which meshes with a rack 228 formed at the under side of the carrier slide. The back plates 44 move forward over corresponding front plates 42 until the heel-measuring slide 162 secured to the T-shaped slide 152 has measured the heel lengthwise. The bell-crank lever 226 is held in its lowered position by a pawl and ratchet arrangement 230 (Fig. 1). After the heel has been measured lengthwise the operator rotates the screw 148 until the abutments 222 have measured the heel widthwise as above described.

The suspension blocks 178 which engage within corresponding slots 184 (Figs. 10 and 13) of the platform 153 and have recesses 186 within which the depending pin 188 secured to the slide 152 registers, are adjusted into different forward and rearward positions with the back plates 44. When the illustrated heel 38 is measured in the gage 94 (Fig. 11) the depending flanges 176 of the right and left suspension blocks 178 overlie the heads 218 of two of the filler plates 210 supported by the filler plate carrier 212. As above explained the front presser members 190 are pivotally secured through pins 194 to corresponding slides 196 which are movable along guideways 198 of the platform 153. Accordingly, the front presser members 190 are not moved into forward or rearward adjusted positions with the back presser members 172 and the suspension blocks 178.

Figure 15:
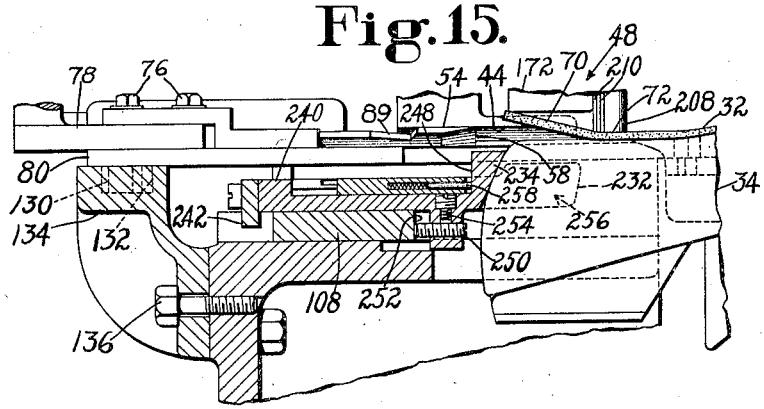
Fig. 15 is a vertical section showing mechanism for positioning the shoe in the machine.

The heel-seat portion of the sole of the shoe is positioned widthwise and lengthwise upon the plates 42, 44 by bifurcated and back gages 232, 234, respectively (Figs. 15, 16). The bifurcated gage 232 is mounted for forward and rearward sliding movement along guideways 236 (Fig. 16) formed in the carrier slide 108 and is provided at its under side with a recess 238 for receiving a rear extension 240 of the back gage 234. Secured to the rear end of the back gage 234 is a depending bar 242 comprising a laterally extending indicating finger 244 (Fig. 7) the purpose of which will be explained later.

The bifurcated gage 232 is urged forward along the guideways 236 of the carrier slide 108 by a pair of spring-pressed plungers 246, the forward movement of the bifurcated gage being limited by an upstanding face 248 of the back gage 234. Forward movement of the back gage 234 under the action of the bifurcated gage 232 is limited by the engagement of the depending bar 242 secured to the back gage, with the rear face of the carrier slide 108. When a screw 250 which is in threaded relation with the back gage 234 has been forced (Fig. 15) under pressure of the shoe against the end 252 of a slot formed in the carrier slide 108, the shoe is properly positioned lengthwise in the machine. The back gage 234 is provided with a set screw 254 for securing the screw 250 in its adjusted position.

In positioning the shoe in the machine the operator engages the front plates 42 in the rear end of the rand crease of the shoe and moves the shoe rearward, forcing the counter of the shoe against faces 256 of the bifurcated gage 232 to center the heel end of the shoe and then moving the back gage together with the bifurcated gage 232 rearward under pressure of the shoe until the screw 250 engages the face 252 of the carrier slide 108 for positioning the shoe lengthwise in the machine.

In order that the operator may tell at a glance when the shoe has been properly positioned in the machine there is provided an indicator 260 (Fig. 7) which is adjustably secured through a slot-and-screw connection 262 to the carrier slide 108. When the screw 250 (Fig. 16) carried by the back gage 234 has been moved into engagement with the face 252 of the carrier plate 108 the indicator finger 244 secured to the back gage is in alinement with an upstanding portion 264 of the indicator 260.

After the shoe has been positioned in the machine the operator depresses a treadle 266 (Figs. 1 and 2) thereby lowering the heel gage 94 along the dovetail guideway 98 (Fig. 4) of the machine frame through mechanism which will be described later. During the first part of the downward movement of the heel gage 94 the front and back presser members 172, 190 move as a unit toward the heel-seat portion of the sole supported by the front and back plates 42, 44. When the back presser members 172 have forced the margin of the rear part 70 of the heel-seat portion of the sole against the back plates 44, continued downward movement of the heel gage 94 against the action of the springs 202 causes the front presser members 190, including the filler plates 210 which extend beyond faces 268 (Fig. 11) of the respective back presser members 172 and are overlapped by the faces 270 of the suspension blocks 178, to be lowered until they securely clamp the margins of the heel-seat portion of the sole against the front plates 42.

Secured to the rear ends of corresponding knife carriers 78 are rolls 272 (Figs. 4 and 5) engaging within arcuate cam grooves 274 formed in the forward ends of operating arms 276. The operating arms 276 are securely clamped through the provision of a screw 278 (Fig. 1) to a housing 280 mounted for reciprocation along guideways 282 (Fig. 17) of the machine frame. Secured to the under side of the housing 280 is a roll 284 which engages within a camway 286 (Fig. 1) of a rotatable drive cam 288. The housing 280 is provided with a pair of slots in which register flanges 292 of screws 294 which are in threaded engagement with corresponding operating arms 276. After the binding screw 278 has been released the operating arms 276 may be adjusted lengthwise in the housing 280 by turning the screws 294, after which the screw 278 is again set up to clamp the operating arms securely to the housing.

As above stated, it is desirable that the forward cutting movement of the heel-seat-reducing knives 54, 56 be reversed when the lower ends of their cutting edges have moved to corresponding corners 124 of the front plates 42. Since the operating arms 276 have constant paths of travel it will be noted that unless provision is made for varying the starting positions of the knives 54, 56 in accordance with the angular adjustments of the guideways 84, the movement of the knives will not be reversed when the lower ends of their cutting edges have moved forward to corners 124. With the above considerations in view, the cam grooves 274 are constructed and arranged to vary the starting positions of the knives in accordance with the angular setting of the guideways 84 for the knives 54, 56, thereby insuring that the lower corners of the cutting edges 58, 60 of the knives shall move forward to but not substantially beyond corresponding corners 124 of the front plates 42 irrespective of the angular adjustment of the plates and the guideways.

As above stated, the inward movement of the shoulder-forming knives 126 is reversed after the lower ends of their respective cutting edges 129 have moved to the corners 124 of the front plates 42. Since the corners 124 assume different positions along line 122 (Fig. 7) in accordance with the adjustment of the front plates 42, it is desirable that the starting positions of the shoulder-forming knives 126 be changed each time that the plates 42 are adjusted. Accordingly, carrier slides 300 are mounted upon forward projections 298 of the machine frame, each of the slides being provided with a dovetail extension 302 engaging within a guideway 304 (Fig. 4) which is formed in the upper face of the corresponding projection 298 and is disposed at right angles to the vertical median plane 64 (Fig. 6). Secured by screws 306 (Fig. 4) to each of the carrier plates 300 is a lug 308 provided with a groove 310 for receiving a depending pin 312 secured to the corresponding front plate 42. It will be noted that the depending pins 312 move in predetermined curved paths when the front plates are adjusted. The cams 310 are constructed and arranged to insure that during the angular adjustment of the front plates 42 the pins move the carrier slides 300 along their respective guideways 304 to the same extent as corresponding corners 124 of the plates are moved along line 122.

Mounted for reciprocation along a guideway 314 (Fig. 6) formed in each carrier slide 300 is a slide 316 having a rack 318 which is in meshing engagement with a gear segment 320 of a bell-crank lever 322 journaled at 324 in a projection 326 of the corresponding carrier slide 300. Secured to the slide 316 is a block 328 having an arcuate slot 330 for receiving a depending roll 332 mounted upon a threaded bolt 333 which is secured to a corresponding knife carrier 334 by a nut 335. The knife carrier 334 is mounted for reciprocation upon a T-shaped guide plate or guideway 336 having an elongated recess 338 (Fig. 6) through which the bolt 333 passes. Formed integral with the knife carrier 334 is a lug 340 to which a knife holder 342 is adjustably secured through the provision of a screw-and-slot connection 344. The knives 126 fit within recesses 346 (Fig. 4) of corresponding holders 342 and are clamped to the same by screws 348.

The T-shaped guide plates 336 are secured in different angular positions to corresponding carrier slides 300 for varying the paths of travel of the shoulder-forming knives 126 transversely of the sole, through the provision of mechanism which will now be described. The inner end of each of the guide plates 336 is provided with a depending lip 337 (Fig. 4) which engages within the upper portion of a groove 352 formed in the corresponding carrier slide 300. Rotatably mounted in each of the guide plates 336 is a stud 350 the lower end of which is in threaded relation with a nut 353 fitting within the lower undercut portion of the groove 352. An angle clamp 354 having a threaded shank 355 fitting within an opening in the outer end of each of the guide plates 336 underlies an arcuate flange 357 of the corresponding carrier slide 300 and may be forced against the under side of the flange for securing the outer end of the guide plate 336 in adjusted position to the carrier slide, through the provision of a nut 356. The inner ends of the guide plates 336 are secured in their adjusted positions to the respective carrier slides 300 by turning screws 350 to draw the nuts 353 against the overhanging flanges of the grooves 352.

The outer faces 360 (Fig. 4) of corresponding carrier slides 300 and the grooves 352 are centered about axes disposed at right angles to the sole-engaging faces 65 of the front plates 42 and passing through the respective corners 124 of the plates. The arcuate grooves 330 of the blocks 228 are in concentric relation with the grooves 352 and the outer faces 360 of corresponding carrier slides 300 when the shoulder-forming knives 126 are at the inner ends of their cutting strokes. It will be clear, in view of the foregoing, that the knives 126 are so mounted upon the respective knife carriers 334 that the lower ends of their cutting edges 129 move to or, if desirable, slightly past the respective corners 124 of the front plates 42. As above stated, during the angular adjustment of the crease plates the carrier slides 300 are moved along guideways 304 to the same extent as corresponding corners 124 are moved along line 122, the throw of the knife 126 being substantially constant. It will therefore be clear that irrespective of the angular setting of the front plates 42 or the angular setting of the T-shaped guide plates 336 upon the carrier slides 300, the paths of movement of the lower ends of the cutting edges 129 of the knives 126 will substantially engage and terminate at corresponding corners 124 of the front plates 42.

The inner end of each of the bell-crank levers 322 for operating the shoulder-forming knives 126 is pivotally connected through an elongated lever 362 to a slide 364 movable along a guideway 366 (Fig. 17) of the machine frame. Secured to the inner face of the slide 364 is a cam roll 368 (Figs. 1 and 17) engaging within a cam groove 370 of the drive cam 288.

After the machine has been initially adjusted as above described, in accordance with the shape of the heel measured in the heel gage 94, and the shoe has been positioned in the machine, the operator depresses the treadle 266 (Figs. 1 and 2) thereby forcing the margin of the heel-seat portion of the sole securely against portions of the front and back plates 42, 44 bordering the U-shaped opening 46, preparatory to operating the shoulder-forming and the heel-seat reducing knives. The treadle 266 is secured to a shaft 374 journaled in the machine frame. Secured to the rear end of the shaft 374 is an arm 375 (Fig. 2) operatively connected by a rod 376 to a lever 378 pinned to a shaft 380 which is rotatably mounted in the machine frame. Pivotally connected to a lever 381 secured to the shaft 380 is a screw 382 which passes through a trunnion 384 carried by a bifurcated portion 385 (Fig. 3) of a rocker arm 386. A spring 388 surrounding the screw 382 is interposed between a shoulder of the screw 382 and the trunnion 384, a nut 390 which is in threaded relation with the upper end of the screw 382 operatively connecting the screw and the trunnion. The rocker arm 386 is secured to a shaft 392 journaled in the machine frame and is provided with a bifurcated portion 394 for receiving a block 396 pivotally connected to the heel gage 94. The heel gage 94 and the clamp 48 are moved into their raised positions when pressure against the treadle is released, through the provision of a spring 398, the respective upper and lower ends of which are secured to the main frame and to a pin connected to the rod 376.

Power is supplied to the machine by an electric motor 400 operatively connected through suitable mechanism, which need not be described in detail, to a driving shaft 402.

After the treadle 266 has been depressed sufficiently to clamp the positioned heel-seat portion of the sole as above described, the treadle is further depressed causing the spring 388 (Fig. 1) to be compressed and also causing a lug 404 (Fig. 2) of the treadle to swing a lever 406, which is secured to the forward end of a shaft 408 journaled in the machine frame, in a clockwise direction. Movement of the shaft 408 in a clockwise direction causes a rod 410 to be lowered, thereby tripping a one-revolution clutch 412 and rotating the drive cam 288 through the drive gear 402. One revolution of the drive cam 288 causes the heel-seat reducing and the shoulder-forming knives to operate through one cycle for forming the tab 36. When the machine comes to rest the operator removes his foot from the treadle 266, the heel gage 94 and the clamp 48 being moved into their raised positions (Fig. 11) under the action of the spring 398. The shoe is then removed from the machine and the screw 148 is rotated to move the abutments 222 away from the heel, after which the lever 226 is released and swung into its raised position permitting the heel to be removed from the heel gage 94.

In order to increase the output of the machine I have provided a modified construction (Figs. 22, 23 and 24) comprising mechanism which is actuated by a lever 414, and through the use of which the crease plates, the various parts of the clamp, and the guideways for the heel-seat reducing and the shoulder-forming knives, may be quickly and effectively adjusted into their different operating positions in accordance with the lengthwise and widthwise dimensions of a heel in a heel gage 94a. When the machine is idle the operating lever 414, which is loosely mounted upon a fixed bearing 416 and corresponds to the lever 226 of the machine above described, is held in a raised position. When the lever is raised, a screw 418 carried by the lever engages a face 420 (Fig. 22) of a gear segment 422. The gear segment 422 is loosely mounted upon the bearing 416 and is urged toward the screw by a spring 424, the respective front and rear ends of which are secured to the lever 414 and to the gear segment. Mounted upon the bearing 416 is another gear segment 426 arranged to mesh with a rack 428 which is slidable in a guideway 430 of the machine frame and is normally urged downward by a spring 432. A screw 434 which is adjustably secured to an offset extension 436 of the hand lever 414 is forced against a face 438 of the gear segment 426 during downward movement of the lever, thereby raising the slide 428 against the action of the spring 432. Pivotally mounted upon screws 440 secured to the machine frame are a pair of angular plates 442 having alined slots 444 for receiving a roll 446 mounted upon a screw 448 carried by the slide 428. The upper ends of the angular plates 442 are provided with elongated recesses 450 for receiving blocks 452 (Fig. 23) having recesses in which fit spherical depending members 454 connected to the rear extensions 80 of the front plates 42.

Back plates 456 (Fig. 22) are identical with the above-described back plates 44, with bifurcations 140 removed. In the modified construction the back plates 456 are angularly adjustable about the axis 63 through the front plates 42 and the above-described mechanism which is actuated by the lever 414. A slide 458 (Figs. 23 and 24), corresponding to the slide 152, carries a depending pin 460 similar to the above-described pin 188 which is carried by the slide 152 and engages within recesses 186 (Figs. 4 and 9) of the suspension blocks 178. It will be noted that the back plates 456 are connected to the slide 458 for movement lengthwise of the U-shaped opening through the back presser members 172, the suspension blocks 178 and the pin 460. The slide 458 is provided with a recess 462 (Fig. 24) for receiving an inner slide 464 adjustably secured through a screw-and-slot connection 468 to an abutment 466. The inner slide 464 is provided with a recess 470 in which registers a ball 472, the lower portion of which engages within a groove 474 of tapering depth formed in the slide 458. When the machine is idle the slide 458 is in its rear position, the inner slide 464 being forced against the forward end of the recess 462 by a spring 476. When the hand lever 414 is depressed the slide 458 moves forward causing the abutment 466 to be forced against the rear end of the heel, the breast of which is in engagement with the bar 166 secured to the platform 153 of the heel gage 94a. As the slide 458 continues to move forward the spring 476 is compressed between the inner slide 464 and the outer slide 458, the ball 372 being forced against the face 478 of the heel gage 94a and locking the slide 458 against forward movement. The modified construction is therefore provided with a safety device which prevents the operator from exerting too great a pressure against the heel when the lever 414 is further depressed to measure the heel widthwise.

After placing the heel 38 upon the heel gage 94a, the operator depresses the lever 414, causing the segment gear 422 to move the carrier slide 108 (Figs. 8 and 22) forward. The back plates 456 and the back presser members 172 of the clamp 48 move forward with the carrier slide 108 until the abutment 466 engages the rear face of the heel, the breast of which is in engagement with the bar 166. When the heel has been measured lengthwise, further forward movement of the slide 458 and therefore the abutment is prevented by the above safety device.

As the operator continues to depress the lever 414, the screw 434 secured to the lever engages the segment gear 426 and rotates the same in a clockwise direction (Fig. 22) thereby raising the slide 428 and causing the upper ends of the angular plates 442 to swing away from each other. The above movement of the angular plates 442 is limited when the abutments 422 engage opposite sides of the heel. Since the crease plates, the clamp units, and the guideways for the heel-seat reducing and shoulder-forming knives of the machine are operatively connected to the angular plates 442, as above described, the same are moved into their adjusted operative positions during the above heel-measuring operation. The operator then depresses the treadle 266 first to clamp the positioned heel-seat portion of the sole of the shoe in the machine and then to actuate the heel-seat reducing and the shoulder-forming knives. When the machine has come to rest the operator removes his foot from the treadle, takes the shoe from the machine, and raises the lever 414 to release the heel 38 from the gage 94a.

Having described the invention, what I claim as new and desire to secure by Letters Patent of the United States is:

1. A heel-seat fitting machine having, in combination, a pair of knives movable in converging paths, one of said knives having a leading cutting edge which is arched transversely of its path of movement and the other knife having cutting edges which are arched transversely of their respective paths of movement and are spaced from each other lengthwise of said paths, and mechanism for operating the knives.

2. A heel-seat fitting machine having, in combination, means for securing the heel-seat portion of a sole against movement, a pair of knives, means for guiding the knives in converging paths, said knives having cutting edges which are arched transversely of their respective paths of movement, mechanism for adjusting said means to vary the paths of movement of the knives, and mechanism for operating said knives.

3. A heel-seat fitting machine having, in combination, a pair of knives, means for guiding the knives in converging paths, one of said knives having a cutting edge which is arched transversely of its path of movement, said other knife having cutting edges which are arched transversely of their respective paths of movement and are offset relatively to each other and spaced lengthwise of the path of movement of the knife, mechanism for adjusting said means to vary the paths of movement of the knives, and means for operating the knives.

4. A heel-seat fitting machine having, in combination, means for supporting the heel-seat portion of the sole of a shoe, a pair of knives movable in converging paths, said knives having leading cutting edges constructed and arranged to form spaced incisions in the heel-seat portion of the sole as the knives are moved in said paths, one of said knives also having a trailing cutting edge constructed and arranged to form in said heel-seat portion an incision which is continuous with the incisions formed by said leading cutting edges.

5. A heel-seat fitting machine having, in combination, means for supporting the heel-seat portion of the sole of a shoe, and a pair of knives movable in converging paths, said knives having cutting edges which are arched transversely of their respective paths of movement and are constructed and arranged to form spaced incisions in the heel-seat portion of said sole, one of said knives also having a trailing cutting edge which is arched transversely of its path of movement and is constructed and arranged to form in the heel-seat portion of the sole an incision which is substantially continuous with the incisions formed by the leading cutting edges of the knives.

6. A heel-seat fitting machine having, in combination, means for clamping the heel-seat portion of the sole of a shoe, a pair of blades movable in converging paths, one of said blades being provided with a notch and having a cutting edge which is arched transversely of its path of movement, said other blade having leading and trailing cutting edges which are arched transversely of their respective paths of movement, the trailing cutting edge of the second-named blade being spaced lengthwise of its path of movement from said leading cutting edge and being arranged for reception within the notch of the first-named blade as the blades move forwardly, and means for operating the blades to reduce the heel-seat portion of the sole.

7. A heel-seat fitting machine having, in combination, plates having edges forming a U-shaped opening and constructed and arranged to engage within the rand crease of a shoe, a pair of knives, carriers for the knives, guideways for constraining the carriers and the knives for movement in predetermined paths extending lengthwise of the sole of the shoe, a driving arm for operating each of the carriers, said plates and said guideways being mounted for adjustment about an axis to vary the shape of the U-shaped opening and the paths of movement of the knives in accordance with the shape of the opening, and means for operating said driving arms to cause said knives to reduce the heel-seat portion of the sole.

8. A heel-seat fitting machine having, in combination, means for supporting the heel-seat portion of the sole of a shoe against movement, a pair of knives having cutting edges, means for simultaneously moving the knives forwardly of the sole in predetermined paths, said knives being constructed and arranged to reduce the heel-seat portion of the sole lengthwise and widthwise during their forward movement, and means for varying the respective paths of movement of the knives, portions of the path of movement of a cutting edge of one of said knives being arranged to coincide with portions of the path of movement of a cutting edge of the other knife during the forward movement of the knives.

9. A heel-seat fitting machine having, in combination, plates having edges forming a U-shaped opening, means for effecting relative angular movement of the plates to vary the shape of said opening, knives movable transversely of the heel-seat portion of a sole supported by said plates to form heel-breast receiving shoulders upon the sole, means for reducing the heel-seat portion of the sole, and means operatively connected to said plates for causing the cutting edges of said knives to terminate their cutting movement substantially at the forward corners of the opening irrespective of the angular adjustment of said plates.

10. A heel-seat fitting machine having, in combination, plates having edges forming a U-shaped opening, means for angularly adjusting said plates to vary the shape of said opening, knives mounted for movement in paths extending transversely of the heel-seat portion of a sole supported by said plates to form heel-breast receiving shoulders upon the sole, knives mounted for movement in paths extending lengthwise of the sole to reduce the heel-seat portion of the sole, mechanism for operating the shoulder-forming and the heel-seat reducing knives, and means for causing the cutting edges of the shoulder-forming and the heel-seat reducing knives to terminate their cutting movement substantially at corners defining the open end of the opening irrespective of the angular positions of said plates.

11. A heel-seat fitting machine having, in combination, plates having edges forming a U-shaped opening and constructed and arranged for engagement within the rand crease of a shoe, means for pivotally adjusting the plates to vary the shape of said opening, a pair of guideways, a pair of knives movable transversely of the sole of the shoe along said guideways to form heel-breast receiving shoulders upon the sole, another pair of guideways, a pair of knives movable lengthwise of the sole along the second-named guideways to reduce the heel-seat portion of the sole, means for angularly adjusting said pairs of guideways, and means for causing the cutting edges of the shoulder-forming and the heel-seat reducing knives to terminate their cutting movement substantially at the corners of the plates defining the open end of the U-shaped opening irrespective of the angular positions of the plates and the angular positions of said guideways.

12. A heel-seat fitting machine having, in combination, plates having edges forming a U-shaped opening and constructed and arranged to engage within the rand crease of the sole of a shoe, means for adjusting said plates to vary the shape of said opening, a pair of carrier slides positioned at opposite sides respectively of the shoe and movable toward and away from each other, a guideway secured to each of the carrier slides, a pair of knives movable transversely of the sole in paths determined by said guideways to form heel-breast receiving shoulders upon the sole, and means for adjusting the carrier slides toward and away from each other in accordance with the adjustment of the crease plates.

13. A heel-seat fitting machine having, in combination, a pair of crease plates having edges forming a U-shaped opening and positioned at opposite sides respectively of a plane, means for adjusting the crease plates toward and away from said plane to vary the width of said opening, a pair of carrier slides positioned at opposite sides respectively of said plane and movable toward and away from each other, a guideway secured to each of the carrier slides, a pair of knives movable along said guideways in paths extending transversely of the sole of a shoe supported by said crease plates, mechanism for moving the knives in said paths to form heel-breast receiving shoulders upon the sole, and connections between the crease plates and corresponding carrier slides for causing said slides to be initially adjusted toward and away from said plane to the same extent as corresponding forward portions of the crease plates defining the open end of said opening.

14. A heel-seat fitting machine having, in combination, plates having edges formed and arranged to form a U-shaped opening and to engage within the rand crease of the sole of a shoe, means for pivotally adjusting said plates to vary the width of the U-shaped opening, a pair of carrier slides positioned at opposite sides respectively of the shoe and movable toward and away from each other, a guideway secured to each of the carrier slides, a pair of knives movable transversely of the sole in paths determined by said guideways to form heel-breast receiving shoulders upon the sole, means for adjusting said guideways with relation to corresponding carrier slides to vary the paths of movement of the knives transversely of the sole, and means for adjusting the carrier slides toward and away from each other in accordance with the adjustment of the crease plates.

15. A heel-seat fitting machine having, in combination, a platen having a U-shaped opening and comprising front plates constructed and arranged to engage within the sides of the rand crease of a shoe without substantially distorting the sole of the shoe, said platen also comprising back plates provided with sole-engaging faces which are angularly disposed to and merge with the sole-engaging faces of said front plates, said back plates being adjustable lengthwise of the U-shaped opening with relation to the front plates for varying the length of said opening.

16. A heel-seat fitting machine having, in combination, a pair of knives, means for guiding the knives in predetermined paths, each of said knives having a cutting edge which is arched transversely of its path of movement, means for operating said knives, a pair of units forming a U-shaped opening and constructed and arranged for engagement within opposite sides of the rand crease of a shoe, each of said units having a sole-engaging face which is arranged in angular relation to the paths of movement of said knives and also having a sole-engaging face which is disposed approximately in parallel relation to said paths, and means for swinging one of said knives and a corresponding unit relatively to the other knife and unit.

17. A heel-seat fitting machine having, in combination, spaced front plates having an opening between them and each having a substantially flat sole-engaging face, back plates having sole-engaging faces which are inclined to and merge with the sole-engaging faces of the front plates, said back plates being constructed and arranged to form an opening which is in alinement with the opening between the front plates, knives movable through the second-named opening and then along the sides of the first-named opening to reduce the heel-seat portion of a sole in engagement with said plates, and means for effecting relative movement of the front and back plates lengthwise of the U-shaped opening to vary the length of said opening.

18. A heel-seat fitting machine having, in combination, a pair of front plates spaced to form an opening, said front plates having faces arranged to be engaged by the margins of the forward part of the heel-seat portion of the sole of a shoe, a pair of back plates having faces arranged to be engaged by the rear part of the heel-seat portion of the sole and having grooves which intersect said face to provide an opening which is substantially continuous with the first-named opening, clamping means for forcing the margin of the heel-seat portion of the sole against said front and back plates, a pair of knives movable in predetermined paths and having cutting edges which are arched transversely of said paths and are constructed and arranged to engage within the respective grooves of said back plates as they move in said paths, and means for moving the knives forwardly through the second-named opening to reduce the heel-seat portion of the sole lengthwise and lengthwise of the first-named opening to reduce the heel-seat portion of the sole widthwise.

19. A heel-seat fitting machine having, in combination, opposed pairs of front and back plates having edges forming a U-shaped opening, said plates having faces arranged to be engaged by the margin of the heel-seat portion of the sole of a shoe, said back plates being angularly disposed to corresponding front plates, means for swinging pairs of front and back plates toward and away from each other to vary the width of the U-shaped opening, and means for effecting relative adjustment of the front and back plates lengthwise of said opening to vary the length of the same.

20. A heel-seat fitting machine having, in combination, opposed pairs of front and back plates having edges forming a U-shaped opening and constructed and arranged to engage within the rand crease of a shoe, said back plates being disposed in angular relation to corresponding front plates, a pair of knives, means for clamping the heel-seat portion of the sole of the shoe against portions of said plates bordering the U-shaped opening, means for moving the knives in predetermined paths through the bight portion of the U-shaped opening to reduce the heel-seat portion of the sole lengthwise and then along the sides of the opening to reduce the heel-seat portion of the sole widthwise, means for pivotally adjusting said pairs of front and back plates to vary the width of said opening, and means for varying the paths of movement of the knives in accordance with the angular positions of corresponding pairs of front and back plates.

21. A heel-seat fitting machine having, in combination, opposed pairs of front and back plates having edges forming a U-shaped opening, said front plates being constructed and arranged to engage within the forward ends of the rand crease of a shoe without substantially distorting the sole of the shoe and said back plates being disposed in angular relation to said front plates, means for angularly adjusting right and left pairs of front and back plates to vary the width of the U-shaped opening, and means for moving the back plates with relation to the front plates for varying the length of said opening.

22. A heel-seat fitting machine having, in combination, a pair of plates constructed and arranged to support the heel-seat portion of the sole of a shoe, clamps for forcing the margin of the heel-seat portion of the sole against said plates, a pair of heel-seat reducing knives, means for guiding said knives in predetermined paths, a gage comprising abutments arranged to engage opposite sides of a heel, and connections between the abutments on the one hand and corresponding plates and knife-guiding means on the other hand constructed and arranged to adjust the plates and to vary the paths of movement of the knives in accordance with the widthwise measurement of the heel in said gage.

23. A heel-seat fitting machine having, in combination, opposed pairs of front and back plates having edges forming a U-shaped opening and constructed and arranged to engage within the rand crease of a shoe, a pair of knives movable in paths extending lengthwise of said opening to reduce the heel-seat portion of the sole of the shoe, guideways for said knives, means for adjusting one pair of front and back plates together with a corresponding guideway to vary the shape of the U-shaped opening and to change the path of movement of one of said knives, a gage for measuring a heel lengthwise and widthwise, operative connections between the gage on the one hand and one pair of said front and back plates and one of the guideways on the other hand to move said plates and said guideways into different adjusted positions in accordance with the width of the heel in the gage, and means for adjusting the back plates with relation to the front plates to vary the length of the U-shaped opening in accordance with the lengthwise dimension of the heel in said gage.

24. A heel-seat fitting machine having, in combination, opposed pairs of front and back plates having edges forming a U-shaped opening, said back plates being inclined to the front plates, a pair of clamping units for forcing the margin of the heel-seat portion of the sole of a shoe against portions of the front and back plates bordering said opening, a pair of guideways, a pair of knives movable along the respective guideways in predetermined paths extending generally lengthwise of the U-shaped opening, said knives having cutting edges which are arched transversely of the respective paths, a gage for measuring a heel widthwise, and means for operatively connecting the gage on the one hand to the plates, the clamping units and the guideways on the other hand to adjust the same in accordance with the widthwise dimension of a heel in said gage.

25. A heel-seat fitting machine having, in combination, means for supporting the heel-seat portion of the sole of a shoe, means for reducing said heel-seat portion of the sole for the reception of a heel, a gage constructed and arranged to measure the heel widthwise, and mechanism for adjusting said sole-supporting means and said heel-seat reducing means in accordance with the width of the heel in said gage.

26. A heel-seat fitting machine having, in combination, means for supporting the heel-seat portion of the sole of a shoe, means for reducing the heel-seat portion of the sole for the reception of a heel, a gage for measuring the heel widthwise and lengthwise, mechanism for adjusting said sole-supporting means and said heel-seat reducing means in accordance with the width of the heel in said gage, and mechanism for adjusting the sole-supporting means in accordance with the length of the heel in said gage.

27. A heel-seat fitting machine having, in combination, crease plates provided with sole-supporting faces, said plates having edges forming a U-shaped opening the closed end of which has the general form of the entrance to a tunnel as viewed from the open end of the opening, means for adjusting said crease plates to vary the shape of the opening, clamping members for forcing substantially the entire margin of the heel-seat portion of the sole of a shoe against portions of the plates bordering the U-shaped opening, means for adjusting said clamping members together with corresponding crease plates, knives movable in fixed paths extending through and generally lengthwise of the U-shaped opening to reduce the heel-seat portion of the sole, said knives having cutting edges which are arched transversely of their respective paths of movement, and means for operating the knives.

28. A heel-seat fitting machine having, in combination, front and back plates having edges forming a U-shaped opening and constructed and arranged to engage within the rand crease of a shoe, means for relatively adjusting said front and back crease plates to vary the length of the U-shaped opening, a U-shaped clamp comprising front and back presser members for forcing the margin of the heel-seat portion of the sole against portions of the plates bordering the U-shaped opening, means for relatively adjusting the front and back presser members of the clamp lengthwise of the U-shaped opening in accordance with the relative adjustment of said front and back plates, and means for filling in spaces formed between the front and back presser members of the clamp in order to vary the effective sole-engaging area of the clamp in accordance with variations in the length of the U-shaped opening.

29. A heel-seat fitting machine having, in combination, opposed pairs of front and back plates having edges forming a U-shaped opening and constructed and arranged to engage within the rand crease of a shoe, said back plates being movable with relation to the front plates for varying the length of the U-shaped opening, a clamp for forcing substantially the entire margin of the heel-seat portion of the sole against portions of the plates bordering the U-shaped opening, said clamp comprising front presser members and back presser members, the back presser members being connected to the back plates and movable therewith with relation to the front presser members, said clamp also comprising a plurality of filler plates one or more of which are moved into operating position in accordance with the adjustment of the back plates and the back presser members thereby varying the lengthwise extent of the sole-engaging portion of the clamp in accordance with the length of the U-shaped opening, and means for reducing the heel-seat portion of the sole of a shoe secured between the crease plates and the clamp.

30. A heel-seat fitting machine having, in combination, a plurality of relatively adjustable plates having edges forming a U-shaped opening and constructed and arranged to engage within the rand crease of a shoe, a clamp for forcing the margin of the heel-seat portion of the sole of the shoe against portions of the plate bordering said opening, said clamp comprising relatively adjustable front and back presser members and a plurality of filler plates one or more of which are constructed and arranged to fill gaps of varying width formed between the front and back presser members and to form with said presser members a substantially continuous U-shaped surface for forcing the margin of the heel-seat portion of the sole against said plates.

31. A heel-seat fitting machine having, in combination, a plurality of relatively adjustable plates constructed and arranged to engage within the rand crease of a shoe, a clamp for forcing the margin of the heel-seat portion of the sole of the shoe against said plates, said clamp comprising right and left pairs of front and back presser members and a plurality of filler plates, each of the back presser members being adjustable with relation to the corresponding front presser member and forming a gap of varying width with the front presser member, and means operatively connected to the back presser members for causing one or more of said filler plates to be secured for movement with corresponding front presser members in accordance with the adjustment of the back presser members thereby to fill said gaps between corresponding front and back presser members and therefore to form with said presser members a substantially continuous surface for forcing the margin of the heel-seat portion of the sole against the plates.

32. A heel-seat fitting machine having, in combination, front plates and front presser members for maintaining the forward part of the heel-seat portion of the sole of a shoe in substantially undistorted condition, back plates and back presser members for maintaining the rear part of the heel-seat portion of the sole in inclined relation to the forward part of said heel-seat portion, a pair of knives, and means for moving said knives from the upper to the lower face of the rear part of the heel-seat portion of the sole to trim material from the rear end of the sole and then generally lengthwise of the forward part of the heel-seat portion of the sole to reduce the same widthwise, said back plates and said back presser members being mounted for adjustment lengthwise of the sole with relation to corresponding front plates and front presser members, each of said front presser members comprising a sole-engaging portion of a fixed area and a plurality of filler plates one or more of which are constructed and arranged to be forced into engagement with the sole in accordance with the adjustment of the back plates and the back presser members.

33. A heel-seat fitting machine having, in combination, a pair of plates having edges forming a U-shaped opening and constructed and arranged to engage within the rand crease of a shoe, a pair of clamp units constructed and arranged to force the margin of the heel-seat portion of the sole of the shoe against portions of the plates bordering said opening, each of said plates and its corresponding clamp unit being mounted for adjustment toward and away from the other plate and clamp unit, a gage for measuring the width of a heel, and mechanism for connecting the gage on the one hand to the clamp units and the crease plates on the other hand to vary the positions of the crease plates and the clamp units in accordance with the measured width of the heel in said gage.

34. A heel-seat fitting machine having, in combination, pivotally mounted plates having edges forming a U-shaped opening, pivotally mounted presser members forming a U-shaped clamp for forcing the margin of the heel-seat portion of the sole of a shoe against portions of the plates bordering the U-shaped opening, mechanism for adjusting the plates and the sole-clamping members to the same degree to insure that the same portions of the presser members and the sole-supporting plates shall at all times be in opposed relation to each other, a gage comprising abutments for measuring a heel widthwise, and connections between the abutments on the one hand and corresponding plates and presser members on the other hand for adjusting the plates and the presser members into different angular positions in accordance with the positions of the abutments of said gage.

35. A heel-seat fitting machine having, in combination, means for supporting the heel-seat portion of the sole of a shoe, knives for reducing said heel-seat portion of the sole, knives for forming heel-breast receiving shoulders upon the sole, a gage for measuring a heel widthwise, and mechanism for adjusting the paths of movement of the heel-seat reducing and the shoulder-forming knives in accordance with the measured width of the heel in said gage.

36. A heel-seat fitting machine having, in combination, means for supporting the heel-seat portion of the sole of a shoe, means for reducing the heel-seat portion of the sole for the reception of a heel, a gage for measuring the heel widthwise and lengthwise, mechanism for adjusting the sole-supporting means and the heel-seat reducing means in accordance with the width of the heel, mechanism for adjusting the sole-supporting means in accordance with the length of the heel, and a common operating lever for actuating the first and second-named mechanism.

37. A heel-seat fitting machine having, in combination, means for supporting the heel-seat portion of the sole of a shoe, knives for forming heel-breast receiving shoulders upon said sole, guideways for said knives, a gage for measuring a heel widthwise, and means for adjusting the guideways to vary the paths of movement of said knives in accordance with the measured width of the heel in said gage.

38. A heel-seat fitting machine having, in combination, means for supporting the heel-seat portion of the sole of a shoe, knives for forming heel-breast receiving shoulders upon said sole, guideways for said knives, a gage comprising abutments for measuring a heel widthwise, and operative connections between the guideways and corresponding abutments for varying the paths of movement of said knives in accordance with the measured width of the heel in said gage.

39. A heel-seat fitting machine having, in combination, means for supporting the heel-seat portion of the sole of a shoe, knives movable transversely of the sole to form heel-breast receiving shoulders upon the same, guideways for said knives, a gage comprising abutments for measuring a heel widthwise, operative connections between the abutments and corresponding guideways for adjusting said guideways widthwise of the sole in accordance with the width of the heel, and means for angularly adjusting said guideways.

40. A heel-seat fitting machine having, in combination, crease plates forming a U-shaped opening and constructed and arranged to engage within the rand crease of a shoe, means for moving the crease plates toward and away from each other to vary the width of the opening, knives for forming heel-breast receiving shoulders upon the sole, guideways for the knives, means for adjusting the guideways widthwise of the U-shaped opening in accordance with the adjustment of the crease plates, and means for angularly adjusting the respective guideways about axes disposed substantially at right angles to the sole-engaging faces of the crease plates and intersecting corners of the plates defining the open end of the U-shaped opening.

41. A heel-seat fitting machine having, in combination, means for supporting the heel-seat portion of the sole of a shoe, knives for forming heel-breast receiving shoulders upon said sole, guideways for said knives, a gage having abutments for measuring a heel widthwise, and means comprising operative connections between the abutments and the corresponding guideways constructed and arranged to move the guideways into different adjusted positions widthwise of the sole whereby to vary the paths of movement of the knives in accordance with the positions of said abutments.

42. A heel-seat fitting machine having, in combination, crease plates having edges forming a U-shaped opening and constructed and arranged to engage within the rand crease of a shoe, a gage having abutments for measuring a heel widthwise, a pair of knives for forming heel-breast receiving shoulders upon the sole of the shoe, guideways for the knives, means for connecting said abutments to corresponding crease plates and guideways to vary the width of the U-shaped opening and to move the guideways into different adjusted positions widthwise of the U-shaped opening in accordance with the measured width of the heel in said gage, and means for operating the knives along said guideways.

43. A heel-seat fitting machine having, in combination, one or more heel-seat reducing knives movable in predetermined paths, crease plates constructed and arranged to support the heel-seat portion of the sole of a shoe, one or more of said plates being angularly disposed to said paths, means for clamping the heel-seat portion of the sole against said plates, a gage arranged to receive and measure the length of a heel, and connections between the gage and said one or more crease plates for varying the position of the latter with relation to the paths of movement of the knives in accordance with the measured length of a heel in said gage.

44. A heel-seat fitting machine having, in combination, crease plates having edges forming a U-shaped opening and constructed and arranged to engage within the rand crease of a shoe, knives for reducing the heel-seat portion of the sole of the shoe to an outline corresponding substantially to that of said opening, means for guiding said knives in predetermined paths, means for operating said knives, means for positioning the heel-seat portion of the sole of the shoe upon said crease plates, a gage for measuring a heel widthwise and lengthwise, and means comprising connections between the gage, the crease plates and the knife-guiding means constructed and arranged to vary the length of the U-shaped opening in accordance with the lengthwise dimension of the heel in said gage and to vary the width of the U-shaped opening and the paths of movement of said knives in accordance with the widthwise dimension of said heel.

45. A heel-seat fitting machine having, in combination, heel-seat reducing knives, means for guiding said knives in predetermined paths, means for operating the knives, a platen and a clamp each comprising a plurality of sole-engaging parts constructed and arranged to secure the rear end of the heel-seat portion of the sole of a shoe across the paths of movement of the knives, a gage for measuring a heel lengthwise and widthwise, and connections between the heel gage, the knife-guiding means and corresponding parts of the platen and the clamp to adjust the knife-guiding means, the platen and the clamp in accordance with the measured length and width of a heel in the gage.

46. A heel-seat fitting machine having, in combination, a platen comprising opposed pairs of front and back plates having edges forming a U-shaped opening and constructed and arranged to engage within the rand crease of a shoe, a gage, said gage comprising a fixed member, a slide movable toward and away from said member to measure a heel lengthwise and a pair of abutments movable toward and away from each other to measure the heel widthwise, means for moving said back plates lengthwise of the U-shaped opening with relation to the front plates to vary the length of the U-shaped opening, means for moving opposed pairs of front and back plates to vary the width of said opening, operative connections between the back plates and the slide, operative connections between opposed pairs of front and back plates and the abutments, and means comprising a manually operated member constructed and arranged to adjust the back plates into their proper positions lengthwise of the U-shaped opening to vary the length of said opening in accordance with the position of the slide as it measures the heel lengthwise and then to operate opposed pairs of front and back crease plates relatively to each other to vary the width of the opening in accordance with the positions of the abutments as they measure the heel widthwise.

47. A heel-seat fitting machine having, in combination, plates having edges forming a U-shaped opening and constructed and arranged to engage within the rand crease of the sole of a shoe, means for swinging the plates to vary the width of said opening, means for moving the plates lengthwise of the U-shaped opening as they are swung, means for forcing the margin of the heel-seat portion of the sole against portions of the plates bordering the U-shaped opening, and means for reducing the heel-seat portion of the sole of the shoe.

48. A heel-seat fitting machine having, in combination, a pair of plates having edges forming an opening and constructed and arranged to engage within the rand crease of a shoe, means for swinging the plates to vary the width of said opening, cam-controlled means for causing corners of the plates defining the forward extent of said opening to travel in a straight line as the plates are swung, means for securing the sole of the shoe in position upon the plates, means for reducing the heel-seat portion of the sole, and a pair of knives movable transversely of the sole to form heel-breast receiving shoulders upon the same.

49. A heel-seat fitting machine having, in combination, a pair of plates having edges forming a U-shaped opening and constructed and arranged to engage within the rand crease of a shoe, means for angularly adjusting the crease plates to vary the width of said opening, cam-operated means for causing the corners of the plates defining the open end of the U-shaped opening to travel in a straight line extending transversely of the sole as the plates are angularly adjusted, means for reducing the heel-seat portion of the sole of the shoe, a pair of knives movable transversely of the sole in predetermined paths to form heel-breast receiving shoulders upon the sole, and means for causing the cutting edges of said knives to terminate their movement in said paths substantially at said corners of the plates irrespective of the angular adjustment of said plates.

50. A heel-seat fitting machine having, in combination, plates having edges forming a U-shaped opening and constructed and arranged to support the heel-seat portion of the sole of a shoe, means for pivotally adjusting the plates to vary the width of said opening, means for moving the plates lengthwise of the U-shaped opening as they are pivotally adjusted to cause corners of the plates defining the open end of the opening to lie substantially in a fixed straight line irrespective of the pivotally adjusted positions of the plates, and a clamp for forcing the margin of the heel-seat portion of the sole of the shoe against said plates, said clamp comprising forward portions adjustable toward and away from each other substantially in rectilinear paths extending transversely of the sole and being constructed and arranged to force the forward margins of the heel-seat portion of the sole against portions of the plates which are located adjacent to said corners.

51. A heel-seat fitting machine having, in combination, a platen comprising opposed pairs of front and back plates having edges forming a U-shaped opening and constructed and arranged to engage within the rand crease of a shoe, means for swinging corresponding front and back plates into different adjusted positions, and means for sliding the front plates to a slight extent lengthwise of the U-shaped opening as the same are swung thereby causing portions of the front plates defining the open end of the U-shaped opening to lie in a fixed straight line irrespective of the angular adjustment of the plates.

52. A heel-seat fitting machine having, in combination, opposed pairs of front and back plates having edges forming a U-shaped opening and constructed and arranged to engage within the rand crease of a shoe, means for adjusting the back plates lengthwise of the U-shaped opening with relation to the front plates to vary the length of said opening, means for swinging pairs of front and back plates to the same degree in opposite directions and for imparting a sliding movement lengthwise of the U-shaped opening to the front plates as they are swung thereby causing corners of the plates defining the open end of the U-shaped opening to move in a fixed straight line extending transversely of the sole as the plates are swung.

53. A heel-seat fitting machine having, in combination, opposed pairs of front and back plates having edges forming a U-shaped opening and constructed and arranged to engage within the rand crease of a shoe, means for swinging said pairs of front and back plates to the same degree in opposite directions to vary the width of the U-shaped opening, means for imparting movement lengthwise of the U-shaped opening to the front plates as the same are swung to cause corners of the plates defining the open end of the U-shaped opening to move in a straight line as the plates are moved into different angular positions, knives having cutting edges movable transversely of the sole to form heel-breast receiving shoulders upon the same, and means for causing the cutting edges of the knives to terminate their cutting movement at the respective corners of the U-shaped opening irrespective of the angular adjustment of the plates.

54. A heel-seat fitting machine having, in combination, relatively adjustable plates having edges forming an opening and constructed and arranged to support the heel-seat portion of the sole of a shoe, a gage comprising relatively movable abutments for measuring a heel widthwise, and mechanism for relatively adjusting said plates in accordance with the relative adjustment of the abutments.

55. A heel-seat fitting machine having, in combination, relatively adjustable crease plates having edges forming a U-shaped opening, a gage comprising abutments for measuring a heel widthwise, connections between said abutments and the corresponding crease plates, and mechanisms constructed and arranged relatively to move the abutments for measuring the heel widthwise and relatively to move the crease plates for varying the width of the U-shaped opening in accordance with the width of the heel.

56. A heel-seat fitting machine having, in combination, front and back plates having edges forming an opening, said front plates and said back plates being constructed and arranged to support the forward and the rear parts respectively of the heel-seat portion of the sole of a shoe, a heel gage comprising a slide, mechanism constructed and arranged operatively to connect the slide and the back plates for adjusting the back plates relatively to the front plates in accordance with the length of a heel measured in said gage, and means for reducing the heel-seat portion of the sole.

57. A heel-seat fitting machine having, in combination, crease plates having edges forming a U-shaped opening, a gage which may be set in accordance with the desired width and length of the reduced heel-seat portion of the sole of a shoe, and connections between the gage and the plates for relatively adjusting the plates widthwise and lengthwise of the U-shaped opening in accordance with the setting of the gage whereby to vary the width and the length of said opening.

58. A heel-seat fitting machine having, in combination, crease plates having edges forming a U-shaped opening, a gage for measuring a heel widthwise and lengthwise, and mechanism for relatively adjusting said plates lengthwise and widthwise of the opening to vary the shape of the same in accordance with the shape of the attaching face of the heel in the heel gage.

59. A heel-seat fitting machine having, in combination, a plurality of crease plates having edges forming a U-shaped opening, said plates being relatively adjustable to vary the shape of said opening, a gage comprising a slide for measuring a heel lengthwise and abutments for measuring the heel widthwise, mechanism operatively connected to said slide constructed and arranged to effect relative displacement of the plates lengthwise of the U-shaped opening for varying the length of the opening in accordance with the setting of said slide, and mechanism operatively connected to said abutments constructed and arranged to effect relative displacement of the plates widthwise of the U-shaped opening for varying the width of said opening in accordance with the setting of said abutments.

60. A heel-seat fitting machine having, in combination, spaced front plates having flat sole-engaging faces, a back plate having a sole-engaging face inclined to and merging with the faces of said front plates, said front and back plates having edges forming a U-shaped opening, a gage comprising a slide for measuring a heel lengthwise, and mechanism comprising connections between the slide and the back plates constructed and arranged to adjust the back plate lengthwise of the U-shaped opening with relation to the front plates to vary the length of said opening in accordance with the position of the slide of said gage.

61. A heel-seat fitting machine having, in combination, right and left pairs of front and back plates having edges forming a U-shaped opening and constructed and arranged to engage within the rand crease of a shoe, the sole-engaging faces of the back plates being disposed in angular relation to the sole-engaging faces of the front plates, said pairs of front and back plates being pivotally adjustable and said back plates being adjustable lengthwise of the U-shaped opening with relation to the front plates, a gage comprising a slide for measuring a heel lengthwise and abutments for measuring the heel widthwise, connections between the abutments and corresponding pairs of front and back plates for varying the width of the U-shaped opening in accordance with the position of the abutments, and connections between the slide and the back plates for varying the length of said opening in accordance with the position of the slide.

62. A heel-seat fitting machine having, in combination, right and left pairs of front and back plates having edges forming a U-shaped opening and constructed and arranged to engage within the rand crease of a shoe, means for swinging right and left pairs of plates equal distances in opposite directions, the back plates being adjustable lengthwise of the U-shaped opening with relation to corresponding front plates, a gage comprising a slide for measuring a heel lengthwise and abutments for measuring the heel widthwise, connections between right and left pairs of plates and corresponding abutments for varying the width of the U-shaped opening in accordance with the width of the heel, and connections between the back plates and the slide for moving said plates lengthwise of the U-shaped opening with relation to the front plates in order to vary the length of the U-shaped opening.

63. A heel-seat fitting machine having, in combination, plates having edges forming a U-shaped opening and constructed and arranged to support the heel-seat portion of the sole of a shoe, means for relatively adjusting the plates to vary the width and the length of the U-shaped opening, a U-shaped clamp comprising a plurality of presser members constructed and arranged to force the margin of the heel-seat portion of the sole against portions of the plates bordering the U-shaped opening, means for relatively adjusting the presser members of the clamp lengthwise and widthwise of the U-shaped opening in accordance with the adjustment of said plates, and means for reducing the heel-seat portion of the sole.

64. A heel-seat fitting machine having, in combination, a plurality of plates having edges forming a U-shaped opening, a clamp for forcing the margin of the heel-seat portion of the sole of a shoe against portions of the plates bordering said opening, means for adjusting one or more of said plates to vary the length of the U-shaped opening, and means for varying the sole-engaging area of the clamp in accordance with the length of the opening thereby insuring that substantially the entire margin of the heel-seat portion of the sole shall be effectively forced against said plates irrespective of the length of the opening.

65. A heel-seat fitting machine having, in combination, a plurality of plates having edges formed and arranged to form a U-shaped opening, one or more of said plates being adjustable lengthwise of the opening to vary the length of said opening, a clamp for forcing substantially the entire margin of the heel-seat portion of the sole of a shoe against portions of the plates bordering the U-shaped opening, said clamp comprising a plurality of filler plates one or more of which may be moved into operating position to vary the effective sole-engaging area of the clamp in accordance with the length of the opening, and means for reducing the heel-seat portion of the sole.

66. A heel-seat fitting machine having, in combination, right and left pairs of front and back plates having edges forming a U-shaped opening, right and left clamps comprising a plurality of presser members for forcing substantially the entire margin of the heel-seat portion of the sole of a shoe against portions of the plates bordering the U-shaped opening, means for effecting relative pivotal adjustment of pairs of front and back plates to vary the width of the U-shaped opening, means for effecting relative adjustment of the front and back plates to vary the length of the U-shaped opening, means for effecting relative pivotal adjustment of right and left clamps in accordance with the adjustment of corresponding pairs of front and back plates, and means for varying the sole-engaging area of the clamps in accordance with variations in the length of the U-shaped opening.

67. A heel-seat fitting machine having, in combination, plates having edges forming an opening and constructed and arranged to engage within the rand crease of a shoe, means for relatively adjusting the plates to vary the shape of said opening, a clamp comprising a plurality of presser members constructed and arranged to force substantially the entire margin of the heel-seat portion of the sole against portions of the plate bordering said opening, a gage constructed and arranged to receive a heel, and mechanism for adjusting said presser members and said plates into correlated positions in accordance with the shape of the heel in said gage.

68. A heel-seat fitting machine having, in combination, a pair of plates having edges forming an opening and having faces for supporting the heel-seat portion of the sole of a shoe, said plates being pivotally adjustable for varying the shape of said opening, a pair of knives, means for guiding the knives in predetermined paths, means for operating said knives in said paths to reduce the heel-seat portion of the sole, said knives and said knife-guiding means being mounted for pivotal adjustment together with respective plates for varying the paths of movement of the knives, and means for moving corresponding plates, knives and knife-guiding means into different angular positions.

69. A heel-seat fitting machine having, in combination, a pair of plates having edges forming an opening and constructed and arranged to engage within the rand crease of a shoe, a pair of knives having cutting edges which are inclined to the general plane of the heel-seat portion of the sole of the shoe and are movable in paths extending generally lengthwise of the sole for reducing the heel-seat portion of the same, and means for angularly adjusting the plates and corresponding knives in accordance with the desired shape of the reduced heel-seat portion of the sole.

70. A heel-seat fitting machine having, in combination, means comprising plates and clamps constructed and arranged to maintain the forward part of the heel-seat portion of the sole of a shoe in substantially undistorted condition, and to bend the rear part of said heel-seat portion of the sole away from the upper of the shoe, said plates having edges forming a U-shaped opening and being adjustable with relation to each other for varying the shape of said opening, knives movable in paths extending through and lengthwise of the U-shaped opening and constructed and arranged to reduce the heel-seat portion of the sole lengthwise and widthwise by beveling cuts, means for varying the paths of movement of the knives in accordance with the desired shape of the reduced heel-seat portion of the sole, and means for operating the knives.

71. A heel-seat fitting machine having, in combination, knives movable in predetermined paths and having cutting edges which are arched transversely of the respective paths, a platen comprising plates forming an opening and having sole-supporting faces arranged in oblique relation to the paths of movement of the knives, means for adjusting the plates to vary the shape of the opening, and means for varying the paths of movement of the knives.

72. A heel-seat fitting machine having, in combination, knives movable in predetermined paths for reducing the heel-seat portion of the sole of a shoe, a heel gage comprising members for measuring a heel lengthwise and widthwise, mechanism constructed and arranged first to force one of said members against the heel in the heel gage for measuring the heel lengthwise and then to force other members against the heel for measuring the heel widthwise, said mechanism comprising a safety device for preventing excessive pressure from being applied against the heel by said one member, and connections for varying the paths of movement of the knives in accordance with the setting of the heel gage.

73. A heel-seat fitting machine having, in combination, means for positioning the heel-seat portion of the sole of a shoe, knives movable in predetermined paths, guideways for said knives, means for moving the knives along said guideways to reduce the heel-seat portion of the sole, a gage for measuring a heel, said gage comprising a slide movable into engagement with the heel for measuring the same lengthwise, and abutments movable into engagement with the sides of the heel for measuring the same widthwise, mechanism for operating the slide, mechanism for operating the abutments, a lever for actuating said first and second-named mechanisms, connections between the guideways and the abutments for varying the paths of movement of the knives in accordance with the width of the heel in the gage, and connections between the slide and said means for positioning the heel-seat portion of the sole in accordance with the length of the heel in said gage.

74. A heel-seat fitting machine having, in combination, knives movable in predetermined paths, guideways for the knives, means for moving the knives along said paths to reduce the heel-seat portion of the sole of a shoe, a gage for a heel, said gage comprising a slide movable into engagement with the heel for measuring the same lengthwise and abutments movable into engagement with the sides of the heel for measuring the same widthwise, mechanism for operating the slide, mechanism for operating the abutments, a lever for actuating the first and second-named mechanisms, yieldable connections between the first-named mechanism and the lever, said first-named mechanism comprising a safety device for preventing said slide from exerting excessive pressure against the heel while the heel is being measured widthwise, and connections between said abutments and said guideways for varying the paths of movement of the knives in accordance with the setting of the abutments.

75. A heel-seat fitting machine having, in combination, a gage comprising movable members, means for operating one or more of said members to measure a heel lengthwise, means for operating one or more of said members to measure the heel widthwise, a lever, and yieldable connections between the lever and one of said means, said lever being constructed and arranged to actuate the other of said means.

76. A heel-seat fitting machine having, in combination, a gage comprising movable members, means for operating one or more of said members to measure a heel lengthwise, means for operating one or more of said members to measure the heel widthwise, a lever, yieldable connections between the lever and one of said means, said lever being constructed and arranged to actuate the other of said means, and a safety device for locking one or more of said abutments which have measured one dimension of the heel against excessive pressure against the heel while the other abutments are being operated through the lever to measure the other dimension of the heel.

77. A heel-seat fitting machine having, in combination, means for securing the heel-seat portion of the sole of a shoe in a predetermined position, knives for reducing the heel-seat portion of the sole lengthwise and widthwise, a gage for measuring a heel lengthwise and widthwise, and mechanism for varying the length and the width to which the heel-seat portion of the sole is reduced, in accordance with the length and the width of the heel measured in the gage.

EARL A. BESSOM.